(12) United States Patent
Rittscher et al.

(10) Patent No.: US 12,249,065 B2
(45) Date of Patent: Mar. 11, 2025

(54) QUALITY ASSESSMENT IN VIDEO ENDOSCOPY

(71) Applicant: Oxford University Innovation Limited, Oxford (GB)

(72) Inventors: Jens Rittscher, Headington (GB); Sharib Ali, Headington (GB); Adam Bailey, Headington (GB); James Edward East, Headington (GB); Barbara Braden, Headington (GB); Felix Zhou, Headington (GB); Xin Lu, Headington (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 538 days.

(21) Appl. No.: 17/601,129

(22) PCT Filed: Apr. 3, 2020

(86) PCT No.: PCT/GB2020/050897
§ 371 (c)(1),
(2) Date: Oct. 4, 2021

(87) PCT Pub. No.: WO2020/201772
PCT Pub. Date: Oct. 8, 2020

(65) Prior Publication Data
US 2022/0207728 A1     Jun. 30, 2022

(30) Foreign Application Priority Data

Apr. 5, 2019    (GB) .................................... 1904857

(51) Int. Cl.
*G06T 7/12*       (2017.01)
*G06T 5/00*       (2006.01)
*G06T 7/00*       (2017.01)

(52) U.S. Cl.
CPC .............. *G06T 7/0012* (2013.01); *G06T 5/00* (2013.01); *G06T 2207/10068* (2013.01)

(58) Field of Classification Search
CPC .... G06T 7/00; G06T 5/00; G06T 2207/10068
(Continued)

(56) References Cited

U.S. PATENT DOCUMENTS

| 2011/0075729 A1* | 3/2011 | Dane | H04N 19/15 |
| | | | 375/240.03 |
| 2011/0097008 A1* | 4/2011 | Cao | G06T 5/20 |
| | | | 382/260 |

FOREIGN PATENT DOCUMENTS

| GB | 2559126 A | 8/2018 |
| JP | 2006-122502 A | 5/2006 |

(Continued)

OTHER PUBLICATIONS

International Search Report and Written Opinion for WO 2020/201772 (PCT/GB2020/050897), dated Aug. 5, 2020 pp. 1-20.

(Continued)

*Primary Examiner* — Michael R Neff
(74) *Attorney, Agent, or Firm* — Thomas|Horstemeyer, LLP

(57) ABSTRACT

An analysis apparatus analyses a video image signal comprising successive frames of imaging an endoscopy procedure. A machine learning block analyses the video image signal using a machine learning technique that classifies regions of the frames as belonging to one of plural classes corresponding to respective types of image artefact. The classes include a motion blur class corresponding to motion blur of the image, at least one erroneous exposure class corresponding to a type of erroneous exposure of the image, and at least one noise artefact class corresponding to a type of image artefact that is noise. A quality score block derives (Continued)

quality scores representing image quality of the successive frames based on the classified regions.

25 Claims, 14 Drawing Sheets

(58) Field of Classification Search
USPC .......................................................... 382/128
See application file for complete search history.

(56) References Cited

FOREIGN PATENT DOCUMENTS

| | | |
|---|---|---|
| WO | 2009/067155 A2 | 5/2009 |
| WO | 2013/078582 A1 | 6/2013 |

OTHER PUBLICATIONS

UK Search Report for GB 1904857.8, dated Oct. 1, 2019, pp. 1-3.
S. Chikkerur, V. Sundaram, M. Reisslein, and L. J. Karam, "Objective video quality assessment methods: a classification, review, and performance comparison," IEEE Trans. Broadcast., vol. 57, No. 2, pp. 165-182, 2011.
D. P. Menor, C. A. Mello, and C. Zanchettin, "Objective video quality assessment based on neural networks" Procedia Comput. Sci., vol. 96, pp. 1551-1559, 2016.
S. Ali, C. Daul, E. Galbrun, F. Guillemin, and W. Blondel, "Anisotropic motion estimation on edge preserving Riesz wavelets for robust video mosaicing," Patt. Recog., vol. 51, pp. 425-442, 2016.
H. Liu, W. S. Lu, and M. Q. H. Meng, "De-blurring wireless capsule endoscopy images by total variation minimization," in PACRIM. IEEE, Aug. 2011, pp. 102-106.
T. Stehle, "Removal of specular reflections in endoscopic images," Acta Polytechnica, vol. 46, No. 4, 2006.
S. Tchoulack, J. P. Langlois, and F. Cheriet, "A video stream processor for real-time detection and correction of specular reflections in endoscopic images," in Workshop on Circuit and Syst. and TAISA Conf. IEEE, 2008, pp. 49-52.
M. Akbari, M. Mohrekesh, S. Soroushmehr, N. Karimi, S. Samavi, and K. Najarian, "Adaptive specular reflection detection and inpainting in colonoscopy video frames," arXiv preprint arXiv:1802. 08402, 2018.
A. Mohammed, I. Farup, M. Pedersen, Ø. Hovde, and S. Yildirim Yayilgan, "Stochastic capsule endoscopy image enhancement," J. of Imag., vol. 4, No. 6, 2018.
F. Isabel, B. Sebastian, R. Carina, W. J. We, and S. Stefanie, I. Funke, S. Bodenstedt, C., J. Weitz, S. Speidel "Generative adversarial networks for specular highlight removal in endoscopic images," in Proc. SPIE, vol. 10576, 2018, pp. 10 576-10 576-9.
J. Goodfellow, J. Pouget-Abadie, M. Mirza, B. Xu, D. Warde-Farley, S. Ozair, A. C. Courville, and Y. Bengio, "Generative adversarial nets," in NIPS, 2014, pp. 2672-2680.
P. Viola and M. Jones, "Rapid object detection using a boosted cascade of simple features," in CVPR. IEEE, 2001, pp. 511-518.
P. Sermanet, P. Eigen, X. Zhang, M. Mathieu, R. Fergus, and Y. Le-Cun, "Overfeat: Integrated recognition, localization and detection using convolutional networks," arXiv preprint arXiv:1312. 6229, 2013.
R. Girshick, J. Donahue, T. Darrell, and J. Malik, "Rich feature hierarchies for accurate object detection and semantic segmentation," in CVPR. IEEE, 2014, pp. 580-587.
R. Uijlings, K. E. Van De Sande, T. Gevers, and A. W. Smeulders, "Selective search for object recognition," Int. J. of Comput. vision, vol. 104, No. 2, pp. 154-171, 2013.
S. Ren, K. He, R. Girshick, and J. Sun, "Faster r-cnn: Towards real-time object detection with region proposal networks," in NIPS, 2015, pp. 91-99.
Redmon, S. Divvala, R. Girshick, and A. Farhadi, "You only look once: Unified, realtime object detection," in CVPR. IEEE, 2016, pp. 779-788.
He, X. Zhang, S. Ren, and J. Sun, "Spatial pyramid pooling in deep convolutional networks for visual recognition," in ECCV. Springer, 2014, pp. 346-361.
T.-Y. Lin, P. Dollar, R. B. Girshick, K. He, B. Hariharan, and S. J. Belongie, "Feature pyramid networks for object detection," in CVPR. IEEE, 2017, pp. 936-944.
T.-Y. Lin, P. Goyal, R. Girshick, K. He, and P. Dolla'r, "Focal loss for dense object detection," arXiv preprint arXiv:1708.02002, 2017.
J. Redmon and A. Farhadi, "Yolov3: an incremental improvement," arXiv preprint arXiv:1804.02767, 2018.
T.-Y. Lin, M. Maire, S. Belongie, J. Hays, P. Perona, D. Ramanan, P. Dollar, and C. L. Zitnick, "Microsoft coco: Common objects in context," in ECCV. Springer, 2014, pp. 740-755.
C. A. Z. Barcelos and M. A. Batista, "Image restoration using digital inpainting and noise removal," Image and Vision Comput., vol. 25, No. 1, pp. 61-69, 2007.
Mirza and S. Osindero, "Conditional generative adversarial nets," CoRR, vol. abs/1411.1784, 2014.
J.-Y. Zhu, T. Park, P. Isola, and A. A. Efros, "Unpaired image-to-image translation using cycle-consistent adversarial networks," in ICCV. IEEE, 2017, pp. 2242-2251.
P. Isola, J.-Y. Zhu, T. Zhou, and A. A. Efros, "Image-to-image translation with conditional adversarial networks," CVPR, 2017.
T. Karras, T. Aila, S. Laine, and J. Lehtinen, "Progressive growing of gans for improved quality, stability, and variation," CoRR, 2017.
Kupyn, V. Budzan, M. Mykhailych, D. Mishkin, and J. Matas, "Deblurgan: Blind motion deblurring using conditional adversarial networks," CoRR, vol. abs/1711.07064, 2017.
A. Duhyeon and S. Hyunjung, "Improved training of generative adversarial networks using representative features," CoRR, vol. abs/1801.09195, 2018.
H. Tong, M. Li, H. Zhang, and C. Zhang, "Blur detection for digital images using wavelet transform," in ICME. IEEE, 2004, pp. 17-20.
L. Xu, S. Zheng, and J. Jia, "Unnatural 10 sparse representation for natural image deblurring," in CVPR. IEEE, 2013, pp. 1107-1114.
P. Getreuer, "Total Variation Deconvolution using Split Bregman," Image Process. On Line, vol. 2, pp. 158-174, 2012.
A. Chakrabarti, "A neural approach to blind motion deblurring," in ECCV. Springer, 2016, pp. 221-235.
S. Nah, T. H. Kim, and K. M. Lee, "Deep multi-scale convolutional neural network for dynamic scene deblurring," in CVPR. IEEE, 2017, pp. 257-265.
Buades, T. Le, J.-M. Morel, and L. Vese, "Cartoon+Texture Image Decomposition," Image Process. On Line, vol. 1, 2011.
Arjovsky, S. Chintala, and L. Bottou, "Wasserstein generative adversarial networks," in ICML, 2017, pp. 214-223.
P. Hertzmann, "Algorithms for rendering in artistic styles," Ph.D. dissertation, New York University, Graduate School of Arts and Science, 2001.
J. Shen and T. F. Chan, "Mathematical models for local nontexture inpaintings," SIAM J. of Appl. Math., vol. 62, No. 3, pp. 1019-1043, 2002.
A. Efros and W. T. Freeman, "Image quilting for texture synthesis and transfer," in SIGGRAPH. ACM, 2001, pp. 341-346.
R. Kohler, C. Schuler, B. Scholkopf, and S. Harmeling, "Mask-specific inpainting with deep neural networks," in GCPR. Springer, 2014, pp. 523-534, INCS.
D. Pathak, P. Krahenbuhl, J. Donahue, T. Darrell, and A. A. Efros, "Context encoders: Feature learning by inpainting," In CVPR. IEEE, 2016, pp. 2536-2544.
S. Iizuka, E. Simo-Serra, and H. Ishikawa, "Globally and Locally Consistent Image Completion," SIGGRAPH, vol. 36, No. 4, pp. 107:1-107:14, 2017.
J. Yu, Z. Lin, J. Yang, X. Shen, X. Lu, and T. S. Huang, "Generative image inpainting with contextual attention," CoRR, vol. abs/1801. 07892, 2018. [Reference Online]. Available: http://arxiv.org/abs/1801.07892.
Zhou, A. Lapedriza, A. Khosla, A. Oliva, and A. Torralba, "Places: A 10 million image database for scene recognition," IEEE Trans. Pattern Anal. Mach. Intell., vol. 40, No. 6, pp. 1452-1464, 2018.
H. R. Sheikh and A. C. Bovik, "Image information and visual quality," IEEE Trans. Image Process., vol. 15, No. 2, pp. 430-444, 2006.

(56) References Cited

OTHER PUBLICATIONS

V. Baroncini, L. Capodiferro, E. D. D. Claudio, and G. Jacovitti, "The polar edge coherence: a quasi blind metric for video quality assessment," in EUSIPCO, Aug. 2009, pp. 564-568.

X. Tao, H. Gao, X. Shen, J. Wang, and J. Jia, "Scale-recurrent network for deep image deblurring," in CVPR. IEEE, 2018, pp. 8174-8182.

A. Newson, A. Almansa, Y. Gousseau, and P. Prez, "Non-Local Patch-Based Image Inpainting," Image Process. On Line, vol. 7, pp. 373-385, 2017.

G. R. Cameron et al. "Detection and staging of esophageal cancers within Barrett's esophagus is improved by assessment in specialized Barrett's units". In: Gastrointestinal endoscopy 80.6 (2014), pp. 971-983.

W. Scholvinck et al. "Detection of lesions in dysplastic Barrett's oesophagus by community and expert endoscopists". In: Endoscopy 49.02 (2017), pp. 113-120.

Ali et al., "A deep learning framework for quality assessment and restoration in video endoscopy", Arxiv.org, Cornell University Library, Apr. 15, 2019.

Islam et al., "Non-Informative Frame Classification in Colonoscopy Videos Using CNNs", Biomedical Imaging, Signal Processing, ACM, Oct. 11, 2018, pp. 52-60. 2018.

Wang et al., "Automatic gastroscopy video quality assessment", 2014 IEEE International Conference on Robotic and Biometrics, Dec. 5, 2014, pp. 2709-2714.

Yu et al., "Learning to Detect Multiple Photographic Defects", Arxiv.org, Cornell University Library, Dec. 6, 2016.

Zhao et al., "A deep cascade of neural networks for image inpainting, deblurring and denoising", Multimedia Tools and Applications, Nov. 3, 2017.

Gao et al., "On-demand Learning for Deep Image Restoration", 2017 IEEE International Conference on Computer Vision, Oct. 2017, pp. 1095-1104.

Rodriguez-Sanchez et al., "A deep learning approach for detecting and correcting highlights in endoscopic images", 2017 Seventh International Conference on Image Processing Theory, Tools and Applications, Nov. 28, 2017, pp. 1-6.

Funke et al., "Generative adversarial networks for specular highlight removal in endoscopic images", Progress in Biomedical Optics and Imaging, SPIE—International Society for Optical Engineering, vol. 10576, Mar. 12, 2018, pp. 1057604-1057604.

Ali et al., "Efficient Video Indexing for Monitoring Disease Activity and Progression in the Upper Gastrointestinal Tract", 2019 IEEE 16th International Symposium on Biomedical Imaging (ISBI 2019) (2019): 91-95.

Japanese Office Action for Japanese Patent Application No. P2021-559174, dated Feb. 27, 2024, pp. 1-4 (Translation Included).

Wei Hua et al. Low-Light Image Enhancement Based on Joint Generative Adversarial Network and Image Quality Assessment (2018) 11th International Congress on Image and Signal Processing, BioMedical Engineering and Informatics (CISP-BMEI).

\* cited by examiner

Fig. 9
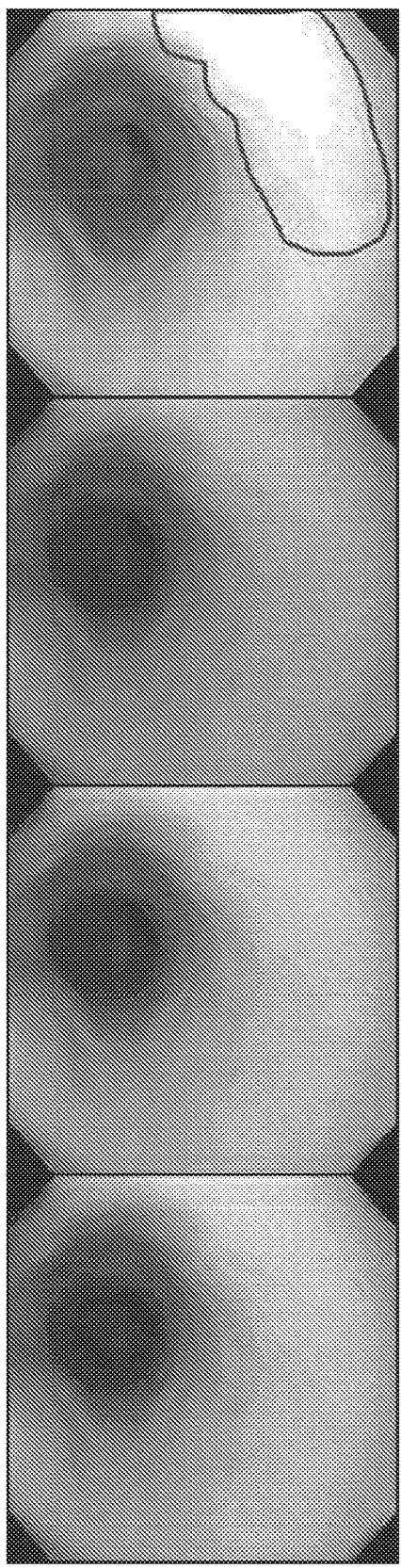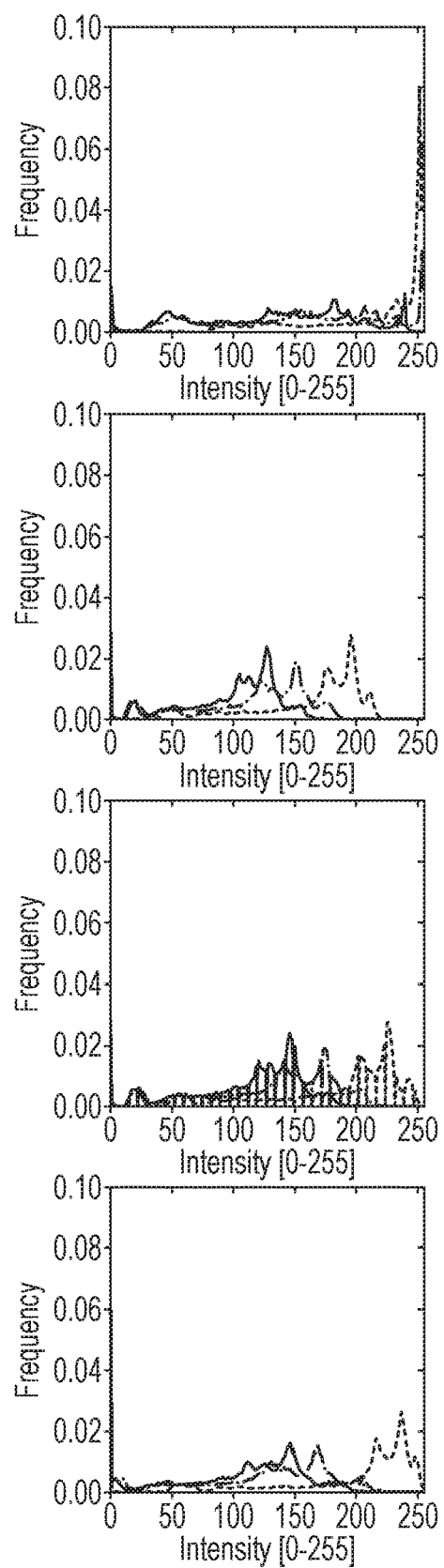

Fig. 9 (Cont. I)
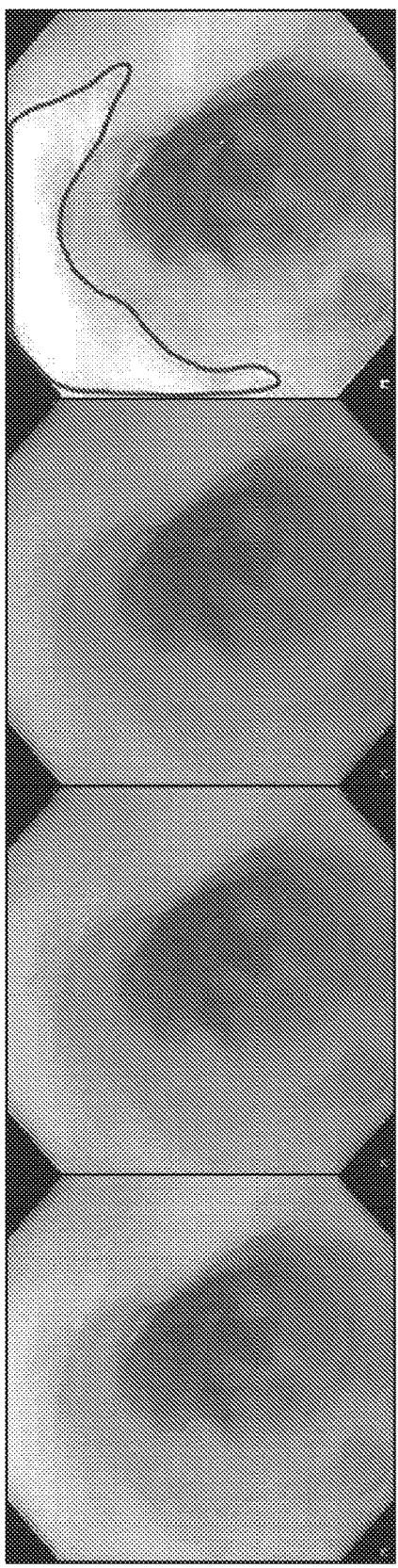
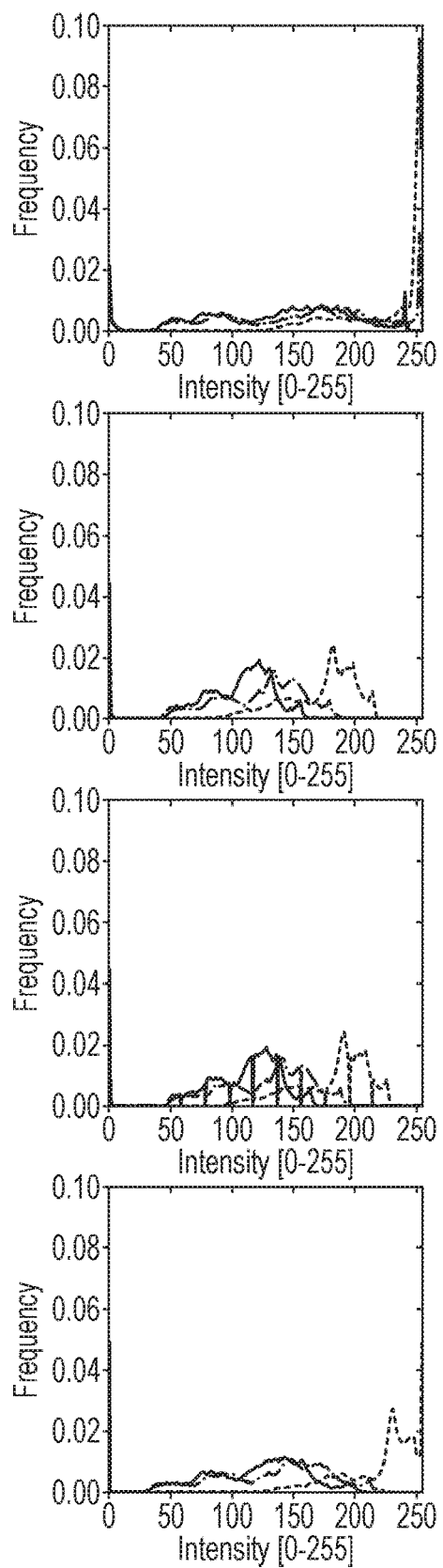

Fig. 9 (Cont. II)
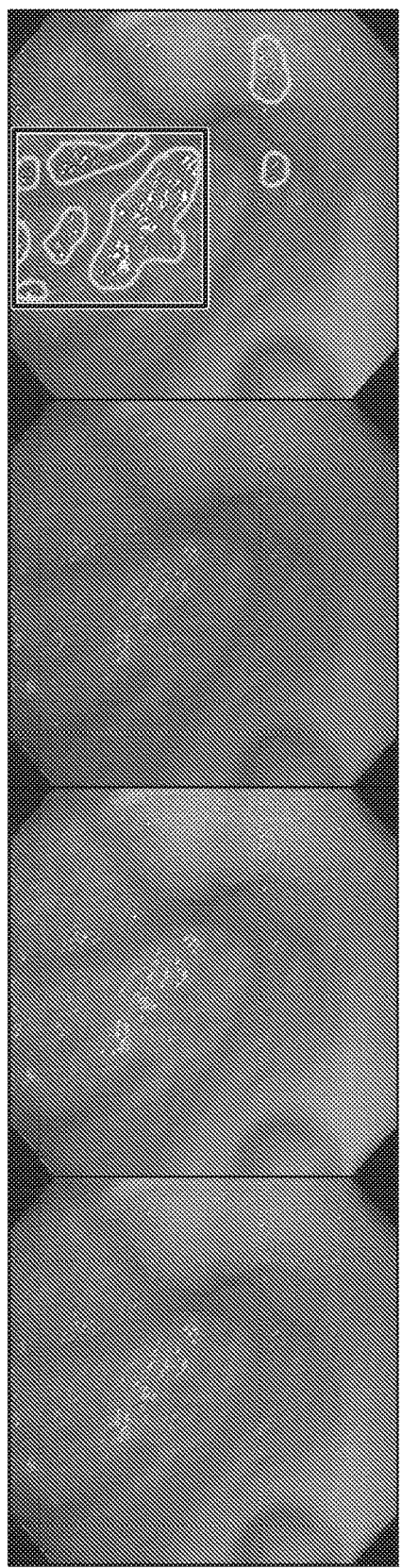
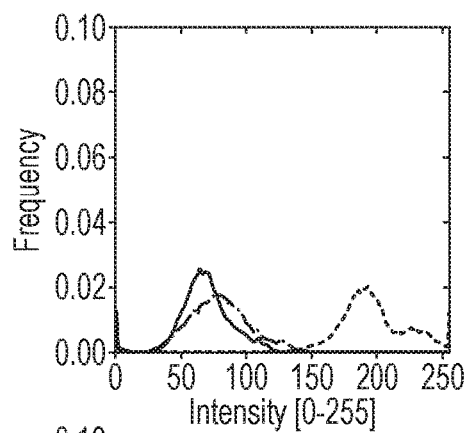
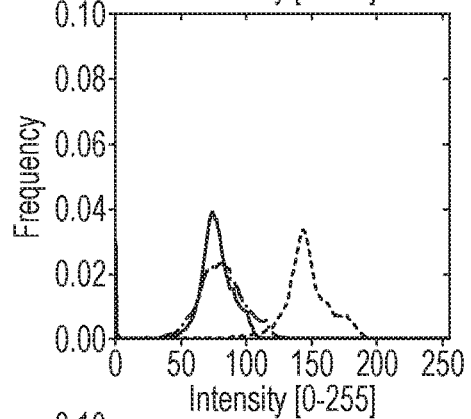
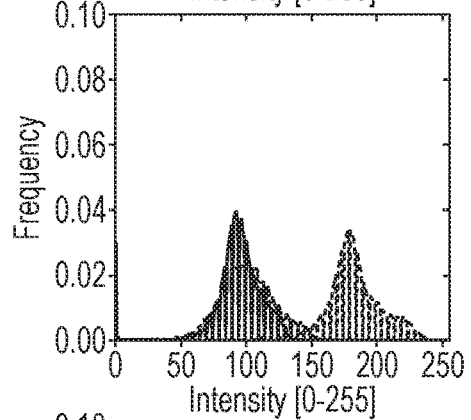
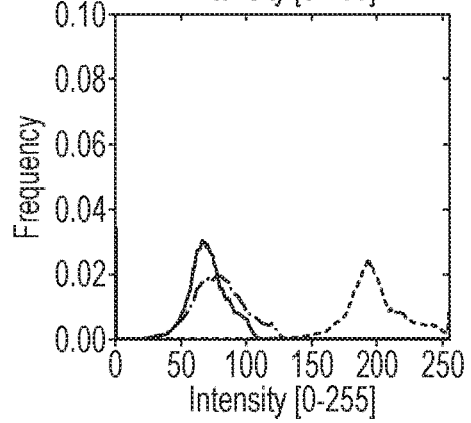

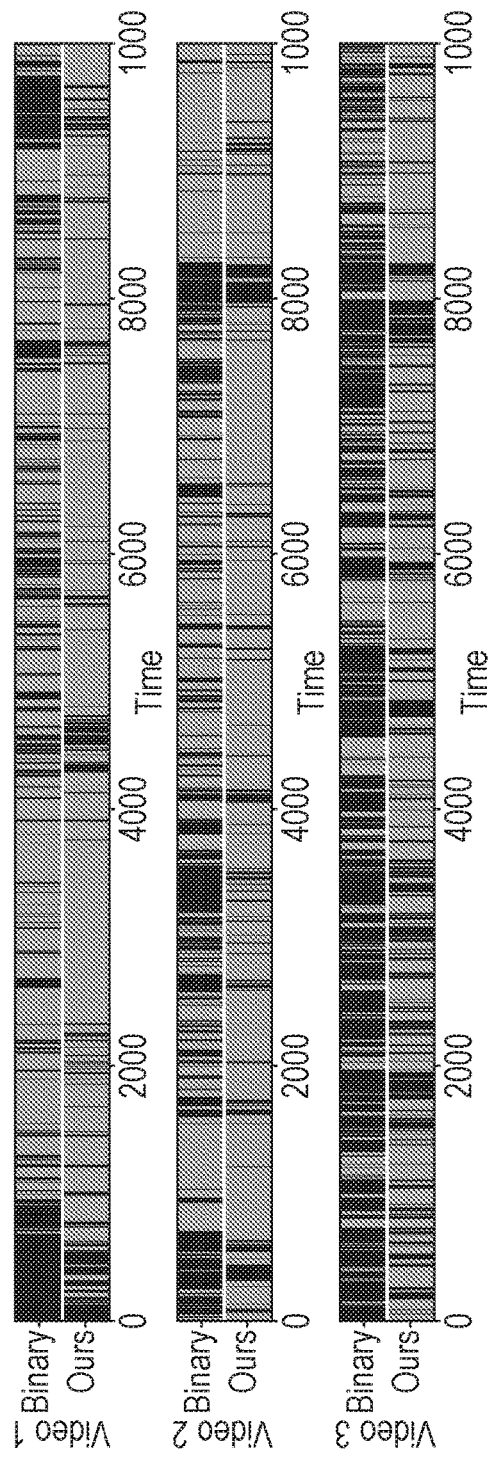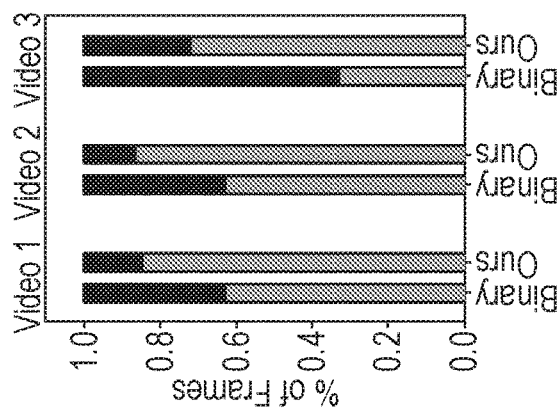
Fig. 11

QUALITY ASSESSMENT IN VIDEO ENDOSCOPY

CROSS-REFERENCE TO RELATED APPLICATIONS

This application is the National Stage of International Application No. PCT/GB2020/050897, filed Apr. 3, 2020, which claims priority to GB 1904857.8, filed Apr. 5, 2019, which are entirely incorporated herein by reference.

The present invention relates to video endoscopy.

Endoscopy is a routine imaging technique used for both diagnosis and minimally invasive surgical treatment. Originally used to image the oesophagus, stomach and colon, miniaturization of hardware and improvement of imaging sensors now enable endoscopy of the ear, nose, throat, heart, urinary tract, joints, and abdomen. Endoscopy provides for monitoring of disease progression, surgical planning, and control of surgical treatment in any such tract. An endoscopy procedure involves capture of a video image signal by an endoscope. The video image signal comprises successive frames imaging the endoscopic procedure.

Common to these endoscopy applications, various different imaging artefacts corrupt the video image and impede the visual interpretation of it, posing significant clinical challenges in the use of endoscopy. The camera in the endoscope is embedded in a long flexible tube. Any small hand motion can cause severe motion artefacts in recorded videos. The light, required for illumination, can interact with tissue and surrounding fluid generating very bright pixel areas (either due to specularity or pixel saturation). Different viewing angles and occlusions can result in contrast issues due to underexposure. Additionally, similar to any other complex real-world imaging applications, visual clutters of debris, liquid, bubbles, etc., can limit the visual understanding of the underlying tissue.

Such artefacts limit the efficacy of endoscopy. For example, the artefacts affect the ability of a medical practitioner to use the video image, for example during diagnosis and treatment. It is part of the reason for the high operator variation amongst endoscopist which directly impacts the quality of diagnosis. By way of example, this is particularly relevant to luminal GI cancers which can only be treated effectively if they are being detected at an early stage, as disclosed in [References 48 and 49]. Similarly, the artefacts adversely affect any computer-assisted endoscopy methods performed on the video image signal, for example video mosaicking for follow-ups and archiving, video-frame retrieval for reporting etc. Various methods of analysing the video image signal are known that deal with the detection and restoration of selected artefacts. However, typically endoscopy video images contain numerous artefacts and as such known analysis methods do not provide a solution that is effective in typical clinical applications.

By way of example, some known analysis methods are as follows.

[References 1 and 2] disclose studies of video frame quality assessment methods. While very useful global video quality metrics are introduced and reviewed, neither information regarding the cause of frame quality degradation nor the degraded regions could be identified for frame restoration. In general, utilizing these quality scores only allows for the removal of frames corrupted with artefacts without considering the severity of each artefact type. Such simple removal of corrupted frames can severely reduce the information content of videos and affect their overall temporal smoothness. One adverse effect of this, for example, can be on mosaicking methods that require at least 60% overlap in successive temporal frames to succeed as disclosed in [Reference 3]. Artefacts are thus the primary obstacles in developing effective and reliable computer assisted endoscopy tools. The precise identification, classification and, if possible, restoration are critical to perform a downstream analysis of the video data.

Detecting multiple artefacts and providing adequate restoration is highly challenging. To date, most research groups have studied only specific artefacts in endoscopic imaging, for example in [References 4-7]. For example, deblurring of wireless capsule endoscopy images utilizing a total variational (TV) approach was proposed in [Reference 4]. TV-based de-blurring is however parameter sensitive and requires geometrical features to perform well. Endoscopic images have very sparse features and lack geometrically prominent structures.

Both hand-crafted features as disclosed in [Reference 5-8] and neural networks as disclosed in [Reference 9] have been used to restore specular reflections. A major drawback of these existing restoration techniques is that heuristically chosen image intensities are compared with neighbouring (local) image pixels. In general, both local and global information is required for realistic frame restoration. One common limitation of almost all the methods is that they only address one particular artefact class, while naturally various different effects corrupt endoscopy videos. For example, both 'specularities' and a water 'bubble' can be present in the same frame. Endoscopists also dynamically switch between different modalities during acquisition (e.g., normal brightfield (BF), acetic acid, narrow band imaging NBI) or fluorescence light (FL)) to better highlight specific pathological features. Finally, inter-patient variation is significant even when viewed under the same modality. Existing methods fail to adequately address all of these challenges.

In addition to addressing one type of imaging artefact, only one imaging modality and a single patient video sequence are considered in most of endoscopy-based image analysis literature, for example [References 5-9].

According to a first aspect of the present invention, there is provided a method of analysing a video image signal comprising successive frames imaging an endoscopy procedure, the method comprising: analysing the video image signal using a machine learning technique that classifies regions of the frames as belonging to one of plural classes corresponding to different types of image artefact, the classes including a motion blur class corresponding to motion blur of the image, at least one erroneous exposure class corresponding to a type of erroneous exposure of the image, and at least one noise artefact class corresponding to a type of image artefact that introduces noise to the frame; and deriving at least one quality score representing image quality of the successive frames based on the classified regions.

The method therefore provides a fully automatic framework that can firstly detect and classify six different primary artefacts, and secondly provide a quality score for each frame The machine learning technique provides multi-class detection for each of motion blur, erroneous exposure and at least one noise artefact, providing simultaneous detection of all types of artefact likely to be encountered in practice. Unlike previous methods (for example in [References 4-9] above) that require manual adjustment of parameter settings or the use of hand-crafted features only suitable for specific artefacts, multiple class artefact detection is applied which may utilizing multi-patient and multi-modal video frames.

The classified regions are used to derive quality score representing image quality of the successive frames. Such a quality score provides several advantages. As it is derived from the classified regions, the quality score is a systematically-derived and reliable measure of quality. Such an approach decreases false classification rate and better generalizes detection methods, and also frame restoration methods if applied subsequently.

The quality score may be used in many ways, for example as follows. The quality score may be provided to the endoscopist in real time, which allows the endoscopist to adapt the endoscopy procedure, for example by repeating endoscopy of parts of the imaged tract or by changing settings of the endoscopy apparatus or procedure. Similarly, the quality score may be used during training of an endoscopist, because it provides reliable information on the quality of the video image signal being captured. In other situations, the quality score may be stored with the video image signal as a record of the quality, which may be used for example to assess clinical utility of a particular video image signal or performance of an endoscopist. This system may also be used for training of endoscopists. The detection of motion blur can, for example, be used directly to provide trainees with information on where they have to slow down or re-examine a certain anatomical area.

The at least one erroneous exposure class may includes two erroneous exposure classes corresponding respectively to over-exposure of the image and under-exposure of the image.

The at least one noise artefact class include one or more of: a noise artefact class corresponding to occlusion of the image by a bubble; a noise artefact class corresponding to specular reflection; a noise artefact class corresponding to a noise artefact other than a bubble or specular reflection. In the latter case, the noise artefact other than a bubble or specular reflection may comprises any one or more of a chromatic aberration or occlusion by debris.

Advantageously, the quality score may have the following characteristics.

The at least one quality score may be based on the areas of the classified regions, the quality scores representing quality that decreases with area.

The at least one quality score may be based on the locations of the classified regions, the quality scores representing quality that is lower for locations that are central in the image than for locations that are not central.

The at least one quality score may include a combined quality score based on the classified regions of all types. This is not essential and quality scores may alternatively be presented in respect of each class corresponding to a type of image artefact. However, the combined quality score is particularly useful because it provides an overall measure of quality.

Such a combined quality score may be based on the areas of the classified regions of each class weighted by weights that are dependent on the class, the quality scores representing quality that decreases with area.

Such a combined quality score may be based on the locations of the classified regions of each class weighted by weights that are dependent on the class, the quality scores representing quality that is lower for locations that are central in the image than for locations that are not central.

The weights may be further dependent on the number of classified regions.

Advantageously, the method may further comprise restoring at least some image frames by processing the image frames to reduce the types of image artefact corresponding to the classes of image artefact to which the classified regions belong.

The image frames that are restored may be selected on the basis of the quality scores. This is advantageous because the quality scores provide a measure of the severity of the artefacts and hence whether reliable restoration is possible. Image frames that are not selected for restoration may be discarded on the basis that they are not of sufficient quality, even after restoration.

The step of restoring may comprise processing the image frames by separate processes for each class to reduce the corresponding type of image artefact.

The separate processes may be performed in a predetermined order of the classes to which the regions belong. Due to the higher likelihood of the presence of multiple artefacts in a single frame, it has been appreciated that unordered restoration of these artefacts is not as effective and may risk significant reduction of frame quality. Therefore a sequential restoration process is used that accounts for the nature of individual types artefact.

Generative adversarial networks with carefully chosen regularization are finally used to restore corrupted frames.

Any or all of the processes may use a Generative Adversarial Network, which may be conditioned on prior information.

Such a Generative Adversarial Network may embed a contextual loss, for example an $l_2$-contextual loss and a high-frequency contextual loss in the case of the process for the motion blur class, an $l_2$-contextual loss in the case of the process for the at least one erroneous exposure class, or an $l_1$-contextual loss in the case of the process for the at least one erroneous exposure class. By choosing the type of regularisation to be dependent on the type of artefact the quality of the restoration is improved.

The predetermined order may comprise the motion blur class followed by the at least one erroneous exposure class followed by the at least one noise artefact class.

The process for the motion blur class may have the following characteristics.

The process for the motion blur class may comprises a blind frame deblurring process, which may deconvolve the frame with an optimised kernel representing the motion blur.

The process for the at least one erroneous exposure class may have the following characteristics.

The process for the at least one erroneous exposure class may comprise a gamma correction process, which may be non-linear and/or comprise correction with an optimised gamma function.

The process for the at least one erroneous exposure class may additionally comprise a colour transfer.

The process for the at least one noise artefact class comprises an inpainting process.

It has been demonstrated that such carefully chosen models can lead to both high quality and very realistic frame restoration.

The machine learning technique may be a convolutional neural network (CNN). Reliable multi-class detection is made possible through a multi-scale and deep convolutional neural network based object detection which can efficiently generalize multi-class artefact detection in cross patients and cross modality present in endoscopic data.

The CNN may be arranged to simultaneously predict the regions and the classes of the regions in a single stage. That single stage of the CNN may use spatial pyramid pooling.

According to a further aspect of the present invention, there is provided a computer program capable of execution by a computer apparatus and configured, on execution, to cause the computer apparatus to perform a method according to any one of the preceding claims. The computer program may be stored on a computer-readable storage medium.

According to a yet further aspect the present invention, there is provided an analysis apparatus for analysing a video image signal comprising successive frames of an endoscopy procedure, wherein the analysis apparatus is arranged to implement a method similar to that of the first aspect of the present invention.

To allow better understanding, an embodiment of the present invention will now be described by way of non-limitative example with reference to the accompanying drawings, in which:

FIG. 9 is a set of frames and associated RGB histograms illustrating the effect of an exposure correction process;

The original video images shown in FIGS. 2-6, 8-10 were colour images.

Figure 1:
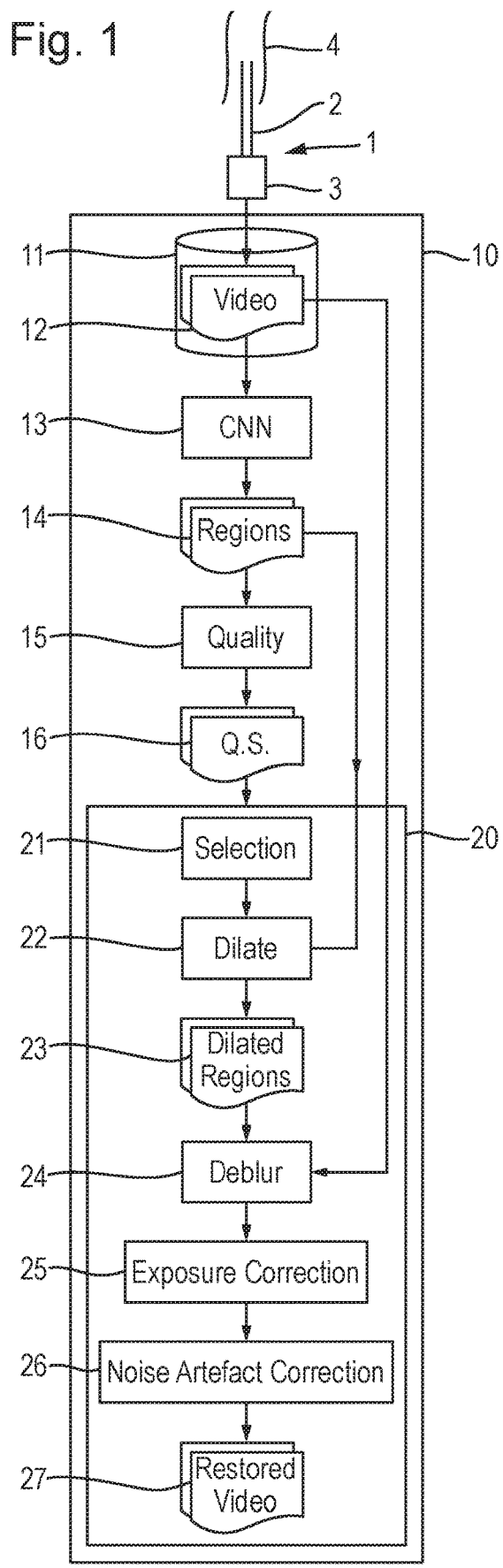
FIG. 1 is a schematic diagram of an endoscope apparatus and an analysis apparatus that analyses a video image signal produced by the endoscope apparatus.

FIG. 1 illustrates an endoscopy apparatus 1 and an analysis apparatus 10 that are arranged as follows.

The endoscope apparatus 1 comprises an endoscope 2 connected to a camera 3. During an endoscopy The endoscope 2 is inserted in a tract 4 of a human (or animal) body and the camera 3 captures a video image signal comprising representing a video image of the endoscopy procedure and comprising plural successive frames. The video image signal is supplied from the endoscopy apparatus 2 to the analysis apparatus 10 for analysis. The endoscopy apparatus 1 is shown schematically and may be in general of any known type, the analysis performed by the analysis apparatus 10 not being dependent on the nature of the endoscopy apparatus 1.

The analysis apparatus 10 may be a computer apparatus which executes a computer program that, on execution, causes the analysis apparatus 10 to perform a method of analysing the video image signal. FIG. 1 illustrates functional blocks that perform the steps of that method. The computer apparatus may be any type of computer apparatus, but is typically of conventional construction. The computer program may be written in any suitable programming language capable of execution by the computer apparatus. The computer program may be stored on a computer-readable storage medium, which may be of any type, for example: a recording medium which is insertable into a drive of the computing system and which may store information magnetically, optically or opto-magnetically; a fixed recording medium of the computer system such as a hard drive; or a computer memory.

A storage unit 11 of the analysis apparatus 10 stores input video data 12 representing the video image signal supplied from the endoscopy apparatus 1.

The analysis apparatus 10 of the analysis apparatus 10 performs the analysis method as follows, providing a systematic and general approach that handles cross modality and inter-patient video image signals for both automatic detection of multiple artefacts present in endoscopic data and subsequent restoration of detected artefacts. Such artefacts may be embodied in frames linearly, non-linearly or both.

A CNN block 13 implements a convolutional neural network (CNN) which is used to analyse the video image signal. A CNN is an example of a machine learning technique. The CNN classifies regions of the frames of the video image signal as belonging to one of plural classes. Those classes correspond to respective types of image artefact, as will be described below. In one example, six classes corresponding to six types of image artefact are illustrated.

Recent research in computer vision provides object detectors that are both robust and suitable for real-time applications. Here, the CNN uses a multi-scale deep object detection model for identifying the different artefacts in real-time.

A general discussion of the machine learning techniques implemented in the CNN is as follows.

Deep learning enables construction of object detectors that generalise traditional hand-crafted 'sliding-window' object classification approaches (for example as disclosed in [Reference 11]).

Earlier attempts of including OverFeat [Reference 12] and R-CNN [Reference 13] demonstrated the power of convolutional neural networks (CNNs) to learn relevant features and detect objects using a fixed number of pre-generated candidate object region proposals [Reference 14]. Faster R-CNNs [Reference 15] first introduced a fully trainable end-to-end network yielding an initial region proposal network and successive classifications of the proposed regions without intermediate processing. Since region proposal generation precedes bounding box detection sequentially, this architecture is known as a two-stage detector. Though very accurate, a primary drawback is its slow inference and extensive training.

Alternatively, a CNN may simultaneously predict the regions and the classes of the regions in a single stage. For example, You Only Look Once (YOLO, [Reference 16]) simplified Faster R-CNNs to predict simultaneously class and bounding box coordinates using a single CNN and a single loss function with good performance and significantly faster inference time. This simultaneous detection is known as a one-stage detector. Compared to two-stage detectors, single-stage detectors mainly suffer two issues: high false detection due to 1) presence of varied size objects and 2) high initial number of anchor boxes requirement that necessitates more accurate positive box mining. The former is corrected by predicting bounding boxes at multiple scales using feature pyramids [References 17-18]. To address the latter, RetinaNet [Reference 19] introduced a new focal loss which adjusts the propagated loss to focus more on hard, misclassified samples. Recently, YOLOv3 [Reference 20] simplified the RetinaNet architecture with further speed improvements. Bounding boxes are predicted only at 3 different scales (unlike 5 in RetinaNet) utilizing objectness score and an independent logistic regression to enable the detection of objects belonging to multiple classes unlike focal loss in RetinaNet. Collectively, Faster R-CNN, RetinaNet and YOLOv3 define the current state-of-the-art detection envelope of accuracy vs speed on the popular natural images benchmark COCO data set [Reference 21].

Due to these advantages, the CNN implemented in the CNN block 13 is advantageously of the type that simultaneously predicts the regions and the classes of the regions in a single stage, including any of the techniques described above, although spatial pyramid pooling is preferably used to enable single stage for capturing both small and large size artefacts. This allows for real-time artefact detection, which is of practical value, for example, allowing the detection results to be used to provide endoscopists with feedback during data acquisition.

The classes corresponding to different types of image artefact that are detected are as follows. The classes may be split into three groups, that is:
1. a motion blur class corresponding to motion blur of the image;
2. at least one erroneous exposure class corresponding to a type of erroneous exposure of the frame; and
3. at least one noise artefact class corresponding to a type of image artefact that introduces noise to the frame.

These will now be considered in turn.

The motion blur class corresponds to motion blur of the image, that is blur caused by movement of the endoscope with respect to the object being imaged. This is common in endoscopy and minimisation of blur is a skill of an endoscopist. Often blur appears as streaking of the image. Motion blur reduces the quality of the image by distorting the object being imaged.

The at least one erroneous exposure class may be either or both of a class corresponding to over-exposure of the image and a class corresponding to under-exposure of the image. The endoscopy apparatus 1 may typically implement exposure control using a variety of techniques known for cameras in general, for example changing the overall exposure setting of the image sensor having regard to the brightness of the captured image. However, despite this, it remains common for endoscopic video images to have regions of over-exposure and/or regions of under-exposure. Over-exposure is observed as a region of bright pixels, and is also referred to below as "saturation". Under-exposure is observed as a region of low contrast, and is also referred to below as "low contrast". Both of these types of erroneous exposure reduce the quality of the image by making features of the object difficult to discern.

The at least one noise artefact class may in general corresponding to any image artefact that introduces noise to the frame. Such image artefacts may be considered as additive noise on the video image, but are typically caused by physical obstructions or optical effects rather than by electrical or other noise occurring in the camera 3.

The at least one noise artefact class may include a noise artefact class corresponding to occlusion of the image by a bubble. Typically in endoscopy video images, water bubbles are present that distort the appearance of the underlying tissue.

The at least one noise artefact class may include a noise artefact class corresponding to specular reflection. Typically in endoscopy video images, mirror-like surface reflection causes artefacts. These will be referred to herein after as "specularities".

The at least one noise artefact class may include a noise artefact class corresponding to a noise artefact other than a bubble or specular reflection, for example a chromatic aberration or occlusion by debris. These will be referred to herein after as "miscellaneous" artefacts.

The CNN block 13 outputs artefact data 14 which identifies the classified regions of the frames of the video image signal. In respect of each classified region, the artefact data 14 identifies both the region itself, i.e. the pixels which make up the region, typically by a bounding box, and the class to which the region belongs.

Figure 2:
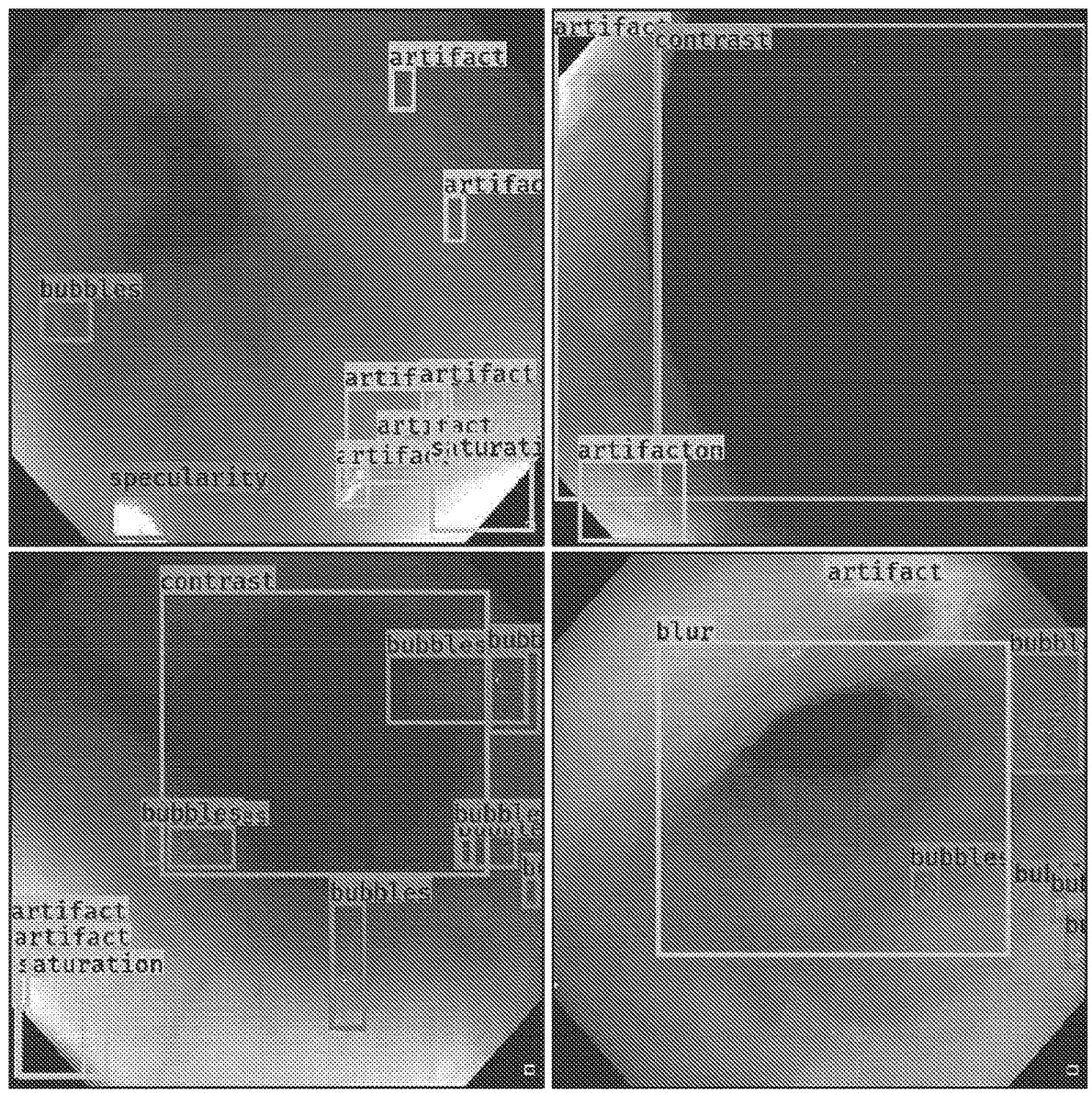
FIG. 2 is four examples of frames of a video image signal having classified regions within those frames superimposed thereon.

By way of example, FIG. 2 illustrates some examples of frames of a video image signal having superimposed thereon bounding boxes and labels identifying regions within those frames that were classified by the CNN block 13 in an example where implemented CNN was YOLOv3-SPP.

A quality score block 15 derives quality scores representing the image quality of the successive frames, based on the classified regions identified by the artefact data 14. The quality score block 15 outputs quality data 16 which represents the quality scores in respect of each frame.

The quality score block 15 derives the quality scores as follows.

Quality assessment is important in video endoscopy as image corruption largely affects image analysis methods. However, it is likely that not all frames are corrupted in same proportion. Depending on the amount and type of artefact present in frames realistic frame restoration can be possible. In this example, the quality scores are combined quality score based on the classified regions of all types in the frame concerned.

The quality score QS represents the quality of the frame and is based on a) the class (i.e. type of image artefact), b) area and c) location within the frame of each classified region in the frame, as follows. Weights are assigned to each of these categories and a mean weight is computed as the quality score. Thus the quality score may be computed as:

$$QS = [1 - \Sigma(\lambda_A W_C W_A + \lambda_L W_C W_L)]_0, \qquad (1)$$

where the sum is over the set of regions associated to each detected artefact in the image, Wc is the class weight associated with the class of the region, $W_A$ is the area weight associated with the area of the region, $W_L$ is the location weight associated with the location of the image, and $\lambda_A$, $\lambda_L$ are relative weights that weight the relative contributions of area and location with respect to each other. The quality score QS thus reduces from a value of one, depending on nature of the classified regions, although it is subject to a lower bound of zero.

The values of each of the class weights $W_C$, the area weights $W_A$ and the location weights $W_L$ are dependent on the ease and importance of restoration associated with the class, area and location of the regions.

The values of the class weights $W_C$ are dependent on the ease of restoration of the respective types of image artefact. For example, motion blur is more easily restored, even across the entire frame, than types of image artefact that introduce noise to the frame, so the class weights for the noise artefact classes are higher than the class weights for the motion blur class. Similarly under-exposure is more easily restored than over-exposure, so the class weights for the over-exposure class is higher than the class weight for the under-exposure class.

As an example of a suitable weighting scheme, the values of the class weights $W_C$ for the classes discussed above may be: motion blur 0.05; saturation 0.10; low contrast 0.05; bubbles 0.10; specularity 0.20; and miscellaneous artefact 0.50.

In equation (1), the term $\lambda_A W_C W_A$ causes the quality score QS to represent the quality decreasing with the area of the classified regions within the frame.

The values of the area weights $W_A$ are dependent on the ease of restoration associated with the area. Thus, the values of the area weights $W_A$ increases with area, because the ease of restoration decreases with area.

As an example of a suitable weighting scheme, the values of the area weights $W_A$ may simply scale linearly with the area of the region, for example being a fraction or percentage of the total area of the frame. As an alternative, the values of the area weights $W_A$ may increase with the area of the region in a non-linear manner.

In equation (1), the term $\lambda_L W_C W_L$ causes the quality score QS to be based on the locations of the classified regions within the frame.

The values of the location weights $W_L$ are dependent on the importance of restoration associated with the location of the region within the frame. That is, restoration is of higher importance for regions in a central location for visual coherence. Accordingly, the location weights $W_L$ increase with proximity to the centre of the frame, thereby representing the quality decreasing with the area of the classified regions within the frame, in particular quality being lower for locations that are central in the image than for locations that are not central.

As an example of a suitable weighting scheme, the values of the location weights $W_L$ for different locations in the region may be: centre part of the region 0.5; left part of the region 0.25; right part of the region 0.25; top part of the region 0.25; bottom 0.25 part of the region; top-left part of the region 0.125; top-right part of the region 0.125; bottom-left part of the region 0.125; and bottom-right part of the region 0.125.

In a simple example, the relative weights $\lambda_A$, $\lambda_L$ may take constant values, for example $\lambda_A=0.5$, $\lambda_L=0.5$. Alternatively, the relative weights $\lambda_A$, $\lambda_L$ are further dependent on the number of classified regions. For example, a weighting scheme where the relative weights $\lambda_A$, $\lambda_L$ take constant values underscores for frames with few detected artefacts (for example less than 5), especially if artefacts of large area are present. Thus in a more complicated weighting scheme thus the constants $\lambda_A$, $\lambda_L$ may increase for decreasing numbers of regions, for example taking the values $\lambda_A=0.5$, $\lambda_L=0.5$ where the number of regions is 5 or more, and taking the values $\lambda_A=1$, $\lambda_L=1$ where the number of regions is less than 5.

Figure 3:
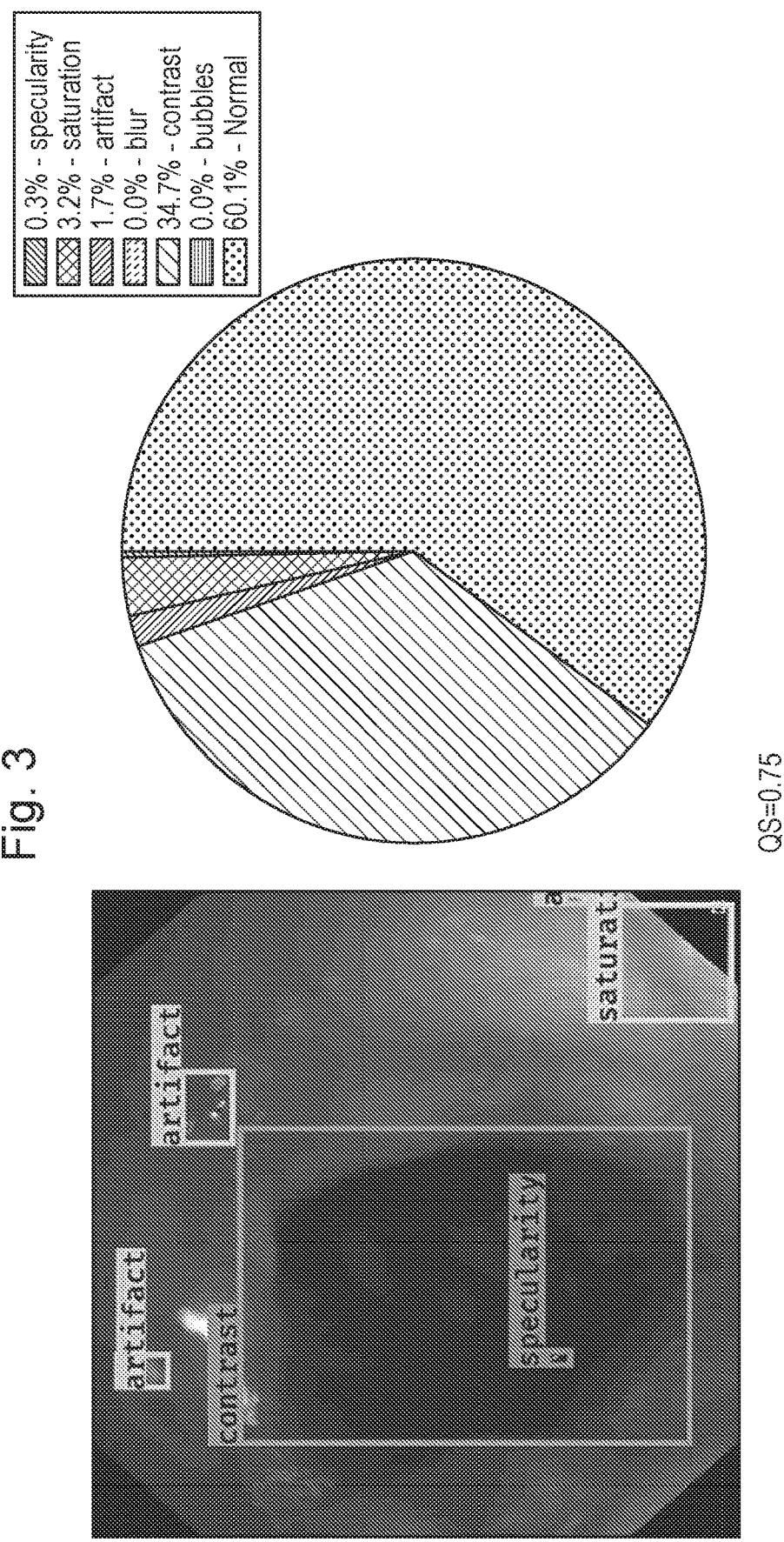
FIGS. 3 and 4 are examples of two frames for which different quality scores were determined, showing the classified regions superimposed thereon, together with pie charts of the areas of the regions in each frame.
Figure 4:
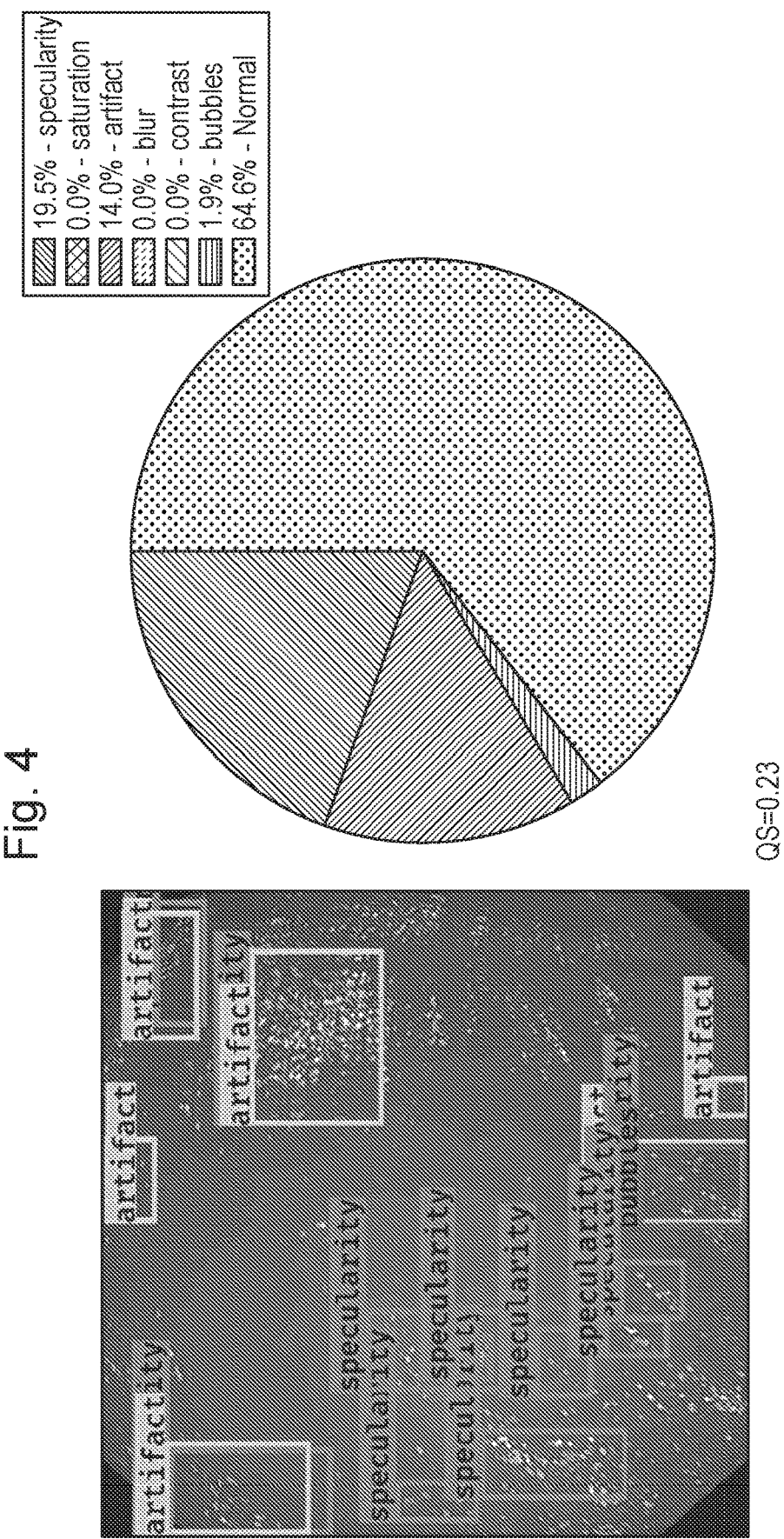

By way of example, FIGS. 3 and 4 show examples of two frames which demonstrate how the quality scores are dependent on class, area and location of the classified regions. The bounding boxes and labels identifying regions within those frames that were classified by the CNN block 13 in an example where implemented CNN was YOLOv3-SPP are superimposed on the images, and shown alongside are pie charts of the areas of the regions in the different classes.

The example in FIG. 3 is a frame which has a region of large area classified in the under-exposure class (labelled "contrast"). However, the quality score takes a relatively high value of 0.75, because the class weights $W_C$ for the under-exposure class is low, despite the central location and large area, which is appropriate because the frame intensity can be readily restored.

The example in FIG. 4 shows that is a frame which has a region multiple miscellaneous artefacts and specularities. The quality score takes a relatively low value of 0.23, because the miscellaneous artefacts and specularities have high class weights $W_C$ and are located centrally which inhibits realistic frame restoration.

Thus, in the above example, each quality score is a combined quality score based on the classified regions of all types in the frame concerned.

However, the quality score block 15 may alternatively or additionally derive quality scores in respect of each type of artefact. That enriches the information provided to the endoscopist, for example allowing the endoscopy procedure to be adapted to reduce a specific type of artefact.

The quality score may be used in many ways, for example as follows. The quality score may be provided to the endoscopist in real time, which allows the endoscopist to adapt the endoscopy procedure, for example by repeating endoscopy of parts of the imaged tract or by changing settings of the endoscopy apparatus or procedure. Similarly, the quality score may be used during training of an endoscopist, because it provides reliable information on the quality of the video image signal being captured. In other situations, the quality score may be stored with the video image signal as a record of the quality, which may be used for example to assess clinical utility of a particular video image signal or performance of an endoscopist.

An image restoration block 20 of the analysis apparatus 10 performs a restoration process on the video image signal represented by the video data 11. The image restoration block 20 provides high quality restoration of many frames of the video image signal, thereby improving the overall quality and usefulness of the video image signal for diagnostic purposes. However, the use of the image restoration block 20 is not essential and the quality scores derived as above are useful in their own right.

The image restoration block 20 includes the following functional blocks.

A selection block 21 selects frames of the video image signal for restoration on the basis of the quality scores represented by the quality score data 16. This recognises that the degree of corruption of the frames affects the degree to whether restoration is worthwhile or possible. Thus, the selection block 21 classifies frames on the basis of the quality score QS being compared with thresholds, for example as follows:

QS<0.5: frame classified as severely corrupted;
0.5≤OS≤0.95: frame classified as mildly corrupted; and
QS>0.95: frames classified as high quality.

The level of the thresholds may be user-specified.

Frames classified as severely corrupted are not selected and are instead discarded without any further processing on the basis that the restoration is not worthwhile because it cannot restore the frame to an acceptable level.

Frames classified as high quality are not selected on the basis that they are already of sufficient quality without the need for restoration. As an alternative, frames classified as high quality could be selected.

Frames classified as mildly corrupted are selected for restoration.

The selected frames are supplied to a dilation block 22. The dilation block 22 dilates the classified regions in the selected frames to provide dilated regions. In respect of the motion blur class, the dilated region may be the entire frame. In respect of the other classes, the dilated region is dilated from the classified region, but is not in general the entire frame, except in the case that the classified region is a sufficiently large area that the dilation extends beyond the boundary of the frame. The dilation block 22 outputs dilation data 23 representing the dilated regions. The dilation data 23 is supplied to the subsequent blocks for further processing.

Three further blocks are present to perform the actual restoration process by processing the image frames to reduce the types of image artefact corresponding to the classes of image artefact to which the classified regions belong, outputting restored video data 27 representing the restored video image signal.

These further blocks are a motion blur correction block 24 which performs a process for restoring the regions classified in the motion blur class, an exposure correction block 25 which performs a process for restoring the regions classified in one of the erroneous exposure classes, and a noise artefact correction block 26 which performs a process for restoring the regions classified in one of the noise artefact classes. Thus, separate processes for each class are performed in these three blocks to reduce the corresponding type of image artefact. As a single frame can be corrupted by multiple artefacts and each artefact class can affect endoscopic frames differently, the separate process can provide effective restoration for all types of image artefact encountered in practice.

The restoration process is particular effective due to performing the processing in this predetermined order of the classes to which the regions belong, that is the motion blur class followed by the at least one erroneous exposure class followed by the at least one noise artefact class. This is for the following reasons.

Image restoration is the process of generating realistic and noise free image pixels from corrupted image pixels. In endoscopic frame restoration, depending upon the artefact type, the goal is either the generation of an entire noise-free image or pixel inpainting of undesirable pixels using surrounding pixel information [Reference 22]. For multi-class endoscopic artefact restoration, the restoration block uses 1) frame deblurring in the motion blur correction block 24 when $h(\cdot)$ is unknown, i.e. a blind deblurring task, 2) minimize the effect of contract imbalance (correction for over- and under-exposed regions in frames, i.e. $\gamma$ correction in the exposure correction block 25, and 3) replace specular pixels and those with imaging artefacts or debris with inpainting, i.e. correction for additive noise $\eta(\cdot)$ or a combined non-linear function $F(\cdot)$ in the noise artefact correction block 26.

Due to the higher likelihood of the presence of multiple artefacts in a single frame, unordered restoration of these artefacts can further annihilate frame quality. Therefore a sequential restoration process is used that accounts for the nature of individual types of artefact.

Formulating the reconstruction of the true signal given the noisy and corrupted input image I as an optimization or estimation problem demands a well-motivated mathematical model. The various different types of artefacts induce a level of complexity that requires a complex solution in order to achieve a high quality result. Assuming image noise to be additive and approximating motion blur as a linear convolution with an unknown kernel is reasonable. In addition, contrast and pixel saturation problems can be formulated as a non-linear gamma correction. Other remaining artefacts (e.g., specularities, bubbles and imaging artefacts) which are due to combined processes of these phenomena can be assumed as a function of the entire process.

If the video image signal is taken as f(t), then the corrupted noisy video frame can thus be approximated as:

$$I(t)=F[(h*f(t)+\eta)^{\gamma}], \quad (2)$$

where $\eta$ denotes the additive noise induced by the imaging system, the convolution with h the approximation to the induced motion blur, $\gamma$ captures the over-exposed and under-exposed regions and F is a generalized non-linear function that models capturing other artefacts as well (including specularities, bubbles and imaging artefacts) or a combination of them.

This model explains why the restoration of the video frames is structured into separate processing steps which are performed in the predetermined order. That is the predetermined order of correcting for motion blur, then erroneous exposure, and then noise artefacts corresponds to the order in which the mathematical operations corresponding to the components of noise operate on the video image signal f(t) in equation (2), that is h, then $\gamma$, and then F. If the restoration is carried out in a different order then, the individual processes can corrupt each other, leading to less effective restoration, or even reduction of frame quality.

The process performed in each of the motion blur correction block 24, the exposure correction block 25 and the noise artefact correction block 26 is implemented using a deep learning model, in particular using a Generative Adversarial Network (GAN), that is conditioned on prior information and embeds a contextual loss.

Recently, GANs [Reference 10] have been successfully applied to image-to-image translation problems using limited training data. In a GAN as applied herein, a generator G 'generates' a sample G(z) from a random noise distribution ($p_{noise}(z)$ with z~N(0, $\sigma^2$I)) while a separate discriminator network tries to distinguish between the real target images ($p_{data}(x)$ with assumed x~non-zero mean Gaussian) and the fake image generated by the generator. The objective function V is therefore a min-max problem in this case:

$$\min G \max DV(D,G)=E_{x \sim p_{data}}(x)[\log D(x)]+E_{z \sim p_{noise}}(z)[\log(1-D(G(z)))] \quad (3)$$

In practice, the generator model in Eq. (3) is highly non-convex, unstable and slow to train as samples are generated from random input noise. Various groups [Reference 23-26] have provided ways to address this problem and achieved improvements in reconstruction quality and numerical stability as well as a reduction in computation time.

Accordingly, one popular way to ensure the stability of the generator output that is applied herein to condition the GAN on prior information (e.g., the class label 'y' in CGAN, [Reference 23]). The objective function Vcond for CGAN can be written as:

$$\min G \max DV_{cond}(D,G)=E_{x,y \sim p_{data}}(x,y)[\log D(x|y)]+E_{y \sim p_y, z \sim p_z}[\log(1-D(G(z|y),y))] \quad (4)$$

Another efficient method which may be applied herein is regularizing the generator using contextual losses (e.g., pix2pix [Reference 25], deblurGAN [Reference 27]). In [Reference 28] regularizing the discriminator and generator significantly helped to improve visual quality.

Such conditional generative adversarial models [Reference 23] (CGAN) embedding artefact class dependent contextual losses are trained for effective restoration. Table I summarises the restoration method applied in each block, which is described in further details below.

TABLE I

| block | Restoration method |
| --- | --- |
| motion blur correction block 24 | CGAN + $l_2$-contextual + high-frequency losses |
| exposure correction block 25 | CGAN + $l_2$-contextual loss + CRT transform |
| noise artefact correction block 26 | CGAN + $l_1$-contextual loss |

The restoration process performed in the motion blur correction block 24 on the classified regions in the motion blur class will now be considered.

Motion blur is a common problem in endoscopy videos. Unlike static images, motion blur is often non-uniform with unknown kernels h(·) (see Eq. (2)) in video frame data. Several blind-deconvolution have been applied to motion deblurring. These range from classical optimization methods [References 29-31] to neural network-based methods [References 32, 33]. Despite good performance of convolutional neural networks (CNNs) over classical methods, a major drawback of CNNs is that they require tuning a large number of hyper-parameters and large training data sets. Blind deconvolution can be posed as an image-to-image translation problem where the blurred image is transformed into its matching unblurred image. Thus, the CGAN implemented in the motion blur correction block 24 uses a blind frame deblurring process which deconvolves the frame with an optimised kernel representing the motion blur.

The CGAN is applied with a $l_2$-contextual loss (squared difference between generated and target/sharp image) and an additional $l_2$ high-frequency loss as regularization. This is motivated by the fact motion blur primarily affects image edges, a few discriminative image pixels compared to the entire image. The high-frequency images are first computed both for blurred and sharp images in the training data using iterative low pass-high pass filtering at 4 different scales [Reference 34]. These images are then used to provide additional information to the discriminator regarding the generator's behaviour.

Figure 5:
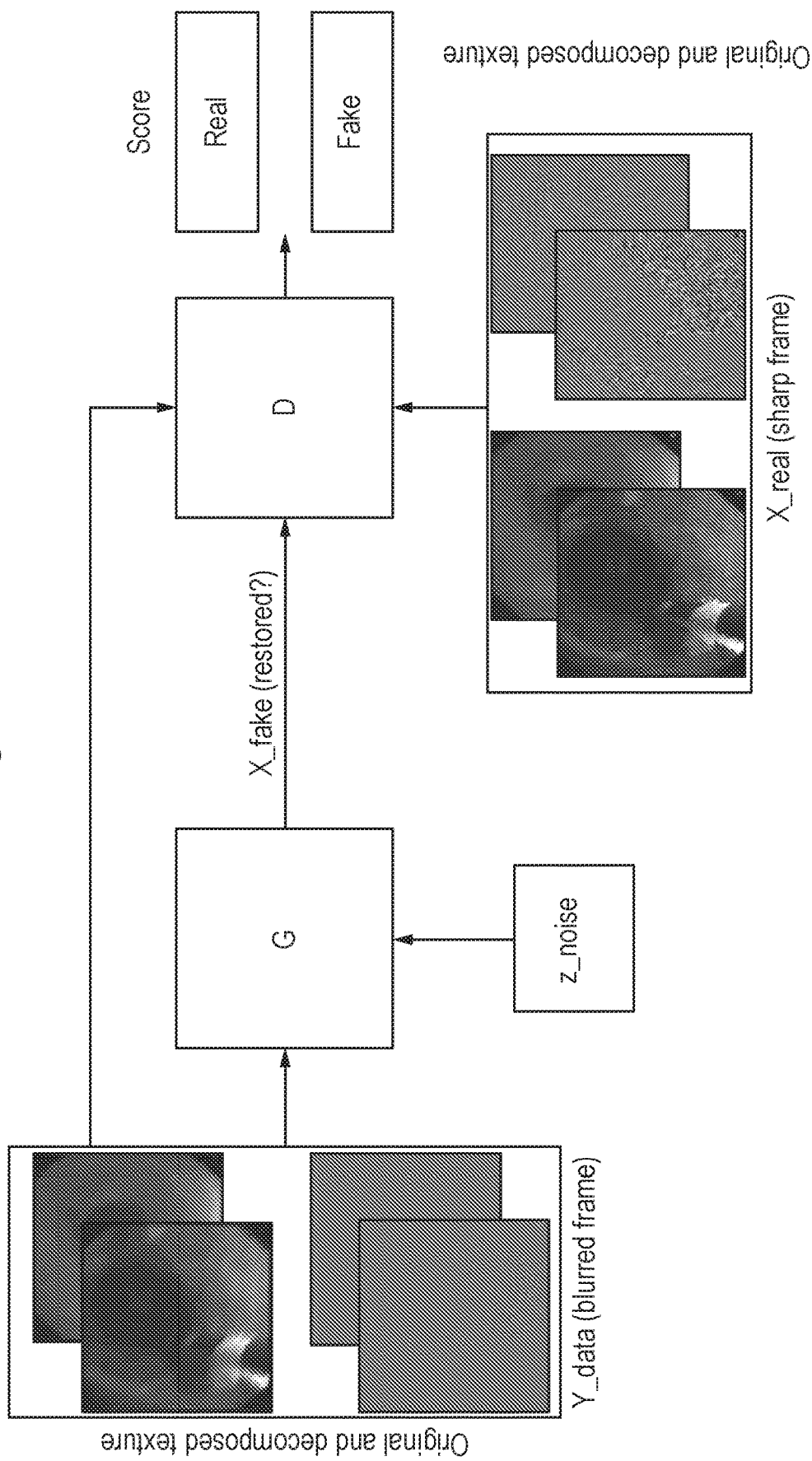
FIG. 5 is schematic diagram of the scoring process implemented in a CGAN implemented in a motion blur correction block.

Accordingly, the CGAN implemented in the motion blur correction block 24 is trained by adapting equation (4) to become:

$$\min G \max D V'_{cond}(D,G) = V_{cond} + \Sigma \lambda \|x_{real\ i} - G(z_i|y_i)\|_i, \quad (5)$$

where the sum is over an original and high-frequency image pair, $\lambda=50$, $l=$. and $x_{real}$ is the ground truth image for restoration (i.e. sharp images in this case). FIG. 5 illustrates the operation of equation (5) graphically, illustrating the contextual high-frequency feature loss.

Minimization of Eq. (4) using Jensen-Shannon (JS) divergence as in [Reference 10] can lead to problems like mode collapse, vanishing gradients. Consequently, [Reference 35] proposed to use Wasserstein distance with gradient penalty (WGAN-GP). The CGAN implemented in the motion blur correction block 24 uses a critic network based on WGAN-GP [Reference 27].

The restoration process performed in the exposure correction block 25 on the classified regions in the in one of the erroneous exposure classes will now be considered. With saturation or low contrast, the small or larger distances between the light source and the imaged tissue can lead to large illumination changes which can result in saturation or low contrast. This motivates the role of the variable γ in Eq. (2). Thus, the restoration process performed in the exposure correction block 25 implements a gamma correction process that is non-linear. This gamma correction process comprises correction with an optimised gamma function.

Saturated or low contrast image pixels often occur across large image areas compared to specularities and affect the entire image globally. In addition, these illumination changes are more prominently observed in normal brightfield (BF) modality compared to other modalities. Compensation of affected image pixels is a difficult problem depending on the size of the affected image area. The saturation restoration task is posed as an image-to-image translation problem and the exposure correction block 25 applies the same end-to-end CGAN approach used for motion deblur described above with $l_2$-contextual loss only to train a generator-discriminator network for saturation removal. Here, $l_2$-contextual loss is more suitable as it is desired to capture the deviation between normal illumination condition with respect to saturation and low contrast conditions.

Due to lack of any ground truth data for two different illumination conditions, the exposure correction block 25 may be trained with a fused data set including: natural scene images containing diffuse (scattered light) and ambient (additional illumination to natural light giving regions with pixel saturation) illuminations 1; and endoscopic image pairs simulated using cycleGAN-based style transfer [Reference 24] (that may be separately trained on other images with saturated and normal BF images).

To correct coloration shift due to the incorporation of natural images in the training set, the process performed in the exposure correction block 25 may further include a color transfer (CRT) applied to the generated frames. Given a source image, Is and a target image, It to recolor, the mean ($\mu_s$, $\mu_t$) and covariance matrix ($\Sigma_s$, $\Sigma_t$) of the respective pixel values (in RGB channels) can be matched through a linear transformation, for example as disclosed [Reference 36]. A suitable linear transform is given by:

$$I'_t = \Sigma_s^{1/2} \Sigma_t^{-1/2} (I_t - \mu_t) + \mu_s, \quad (6)$$

where $I'_t$ is the recolored output. To avoid re-transfer of color from saturated pixel areas in the source, the mean and covariance matrix are computed from image intensities <90% of the maximum intensity value.

Figure 6:
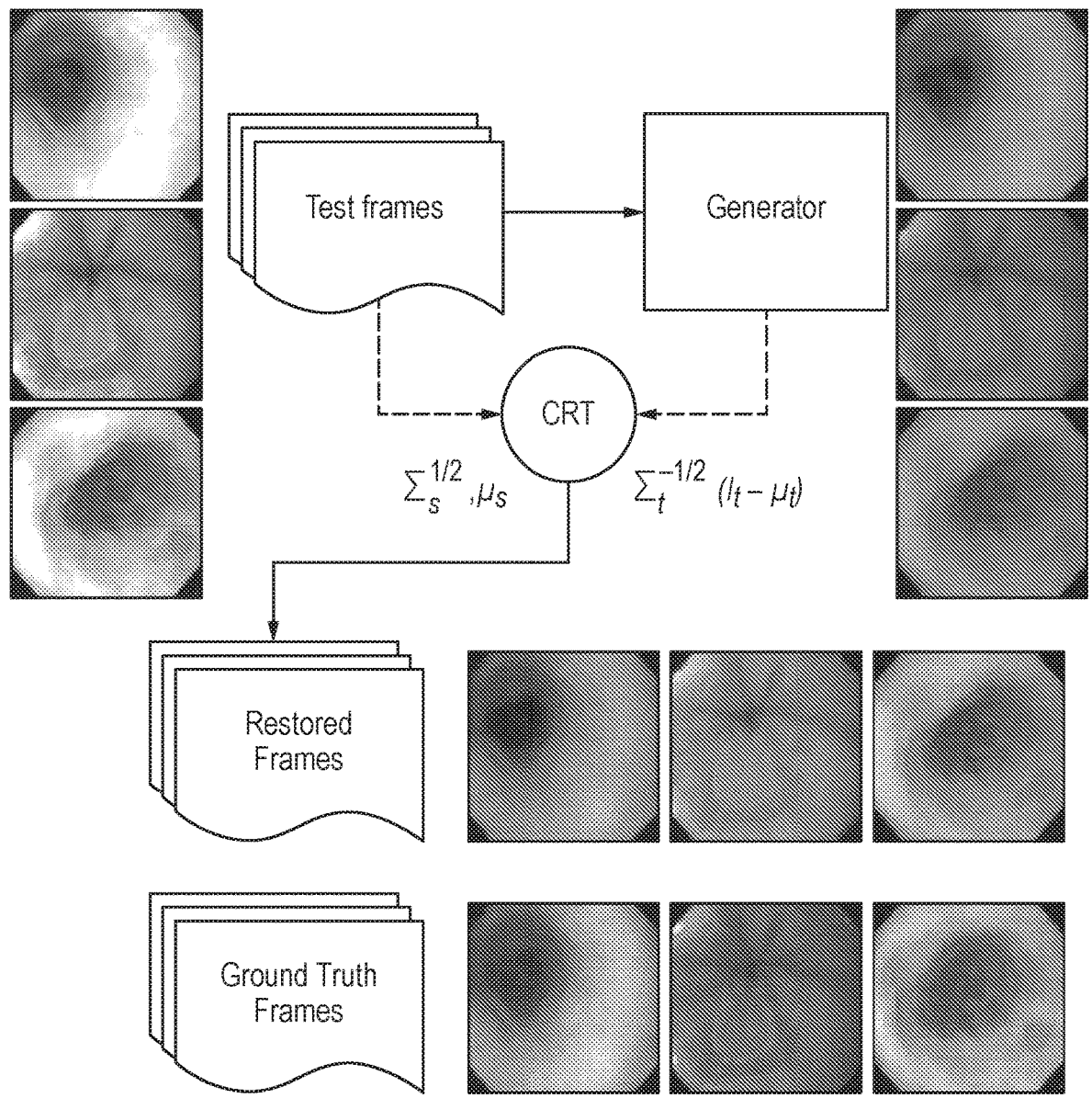
FIG. 6 is a schematic diagram of the process implemented in an exposure correction block, together with some examples of frames processed thereby.

For illustration, FIG. 6 shows an example of generated results from exposure correction block 25 using the trained GAN-based network (on the right) and after color shift correction (bottom) showing very close to ground-truth results.

To recover low contrast frames, the CGAN-saturation network was trained with a reverse image pair of the same training data set. That is, The over-exposure class (saturation) and the under-exposure class (low contrast) are processed in the same manner, except that the training set is reversed.

The restoration process performed in the noise artefact correction block 26 on the classified regions in one of the noise artefact classes will now be considered.

Illumination inconsistencies and view point changes cause strong bright spots due to reflections from bubbles and shiny organ surfaces, and water-like substances can create multi-colored chromatic artefacts (referred to herein as 'imaging or mixed artefact'). These inconsistencies appear as a combination of linear (e.g., additive noise TO and non-linear noise (function F(·)) in Eq. (2). Accordingly, the restoration process performed in the noise artefact correction block 26 comprises inpainting. Such inpainting uses the information of the surrounding pixels as prior information is used to replace the saturated pixels in affected regions.

Inpainting methods that may be applied are as follows. TV-inpainting methods are popular for restoring images with geometrical structures [Reference 37] and patch-based methods [Reference 38] for texture synthesis. However, these methods are computationally expensive. Recent advances in deep neural networks have proven to recover visually plausible image structures and textures [Reference 39] with almost real-time performance. However, they are limited to the size of the mask or the number of unknown pixels in an image. In this context, GANs [References 40-42] have been shown to be more successful in providing faster and more coherent reconstructions even with larger masks. Both contextual and generative losses have been used in these methods. Iizuka et al. [Reference 41] and Yu et al. [Reference 42] used local and global discriminators to improve the reconstruction quality. To enlarge the network receptive field [Reference 42] further used a coarse-to-fine network architecture using WGAN-GP instead of the DCGAN in [Reference 41]. Additionally, a $l_1$ discounted contextual (reconstruction) loss using a distance-based weight mask was used for added regularization [Reference 42]. Due to the reduced training time and better reconstruction quality compared to [Reference 41], the noise artefact correction block 26 may use the network proposed in [Reference 42] for inpainting.

By way of example, experiments using the analysis apparatus 10 were performed as follows.

7 unique patient videos (gastroesophageal, selected from large cohort of 200 videos) were used for training and 10 different videos were used for extensive validations. The experiments utilized well-established video quality assessment metrics to illustrate the effectiveness of the approach. In addition, quality of the restored frames has also been evaluated by two experienced endoscopists. A score based on visual improvement, importance, and presence or absence of any artificially introduced artefact in the restored frames were provided by these experts.

The endoscopy data set for artefact detection was as follows.

The artefact detection data set consisted of a total of 1290 endoscopy images (resized to 512×512 pixels) from two operating modalities; normal bright field (BF), and narrowband imaging (NBI) sampled from 7 unique patient videos selected from a cohort of 200 endoscopic videos for training data. The selection was based on number of representative artefacts present in these videos and texture variability of the underlying esophagus. Two experts annotated a total of 6504 artefacts using bounding boxes where each annotation is classified.

A 90%-10% split was used to construct the train-test set for object detection resulting in 1161 and 129 images and 5860 and 644 bounding boxes, respectively. In general, the training and testing data exhibits the same class distribution and similar bounding boxes (roughly square) but either small with average widths less than 0.2 or large with widths greater than 0.5. Multiple annotations are used in case a given region contains multiple artefacts.

The Faster R-CNN, RetinaNet and YOLOv3 architectures for artefact detection were investigated. Validated open source codes are available for all of these architectures. Experimentally, it was chosen to incorporate YOLOv3 with spatial pyramid pooling (YOLOv3-SPP) for robust detection and improved inference time for endoscopic artefacts detection. Spatial pyramid pooling allowed to pool features from sub-image regions utilizing computed single-stage CNN features at multiple-scales from YOLOv3 architecture. In addition to the boost in the inference speed, incorporating spatial pyramid pooling decreased false positive detections compared to classical YOLOv3 method (see Section IV-B). YOLOv3-SPP provided an excellent feature for accuracy-speed trade-off which are the main requirements for usage in clinical settings.

As to quality assessment metrics, to evaluate the artefact detection the standard mean average precision (mAP) and intersection-over-union (IoU) metrics were used. The detection results of all architectures were quantitatively compared using the mAP at IoU thresholds for a positive match of 5%, 25% and 50% denoted $mAP_5$, $mAP_{25}$ and $mAP_{50}$ respectively, the mean IoU between positive matches, the number of predicted boxes relative to the number of annotated boxes and the average inference time for one image as quantitative measures. For the quality assessment of deblurring methods peak signal-to-noise ratio (PSNR) and structural similarity (SSIM) measures were used. To overcome the limitations of PSNR for quantification of saturation and specularity restoration tasks, also included are more sophisticated visual information fidelity (VIF, [Reference 44]) and relative edge coherence (RECO, [Reference 45]) quality assessment metrics that are independent of the distortion type.

Table II shows artefact detection results on test set with different neural network architectures. All timings are reported on a single 6 GB NVIDIA GTX Titan Black GPU and is the average time for a single 512×512 image (possibly rescaled on input as indicated) evaluated over all 129 test images. The total number of ground truth boxes=644 boxes.

Table II shows that YOLOv3 variants outperform both Faster R-CNN and Retinanet. YOLOv3-spp (proposed) yields the best mAP of 49.0 and 45.7 at IoU thresholds of 0.05 and 0.25 respectively at a detection speed 6 faster than Faster R-CNN [Reference 15]. Even though Retinanet exhibits the best IoU of 38.9, it is to be noted that IoU is sensitive to annotator variances in bounding box annotation which might not resemble the performance of detectors.

TABLE II

| Method | Backbone | Input Size | $mAP_5$ | $mAP_{25}$ | $mAP_{50}$ | $IoU_{25}$ | Predict Boxes | Time (ms) |
| --- | --- | --- | --- | --- | --- | --- | --- | --- |
| Faster R-CNN [Reference 15] | Resnet50 | 600 × 600 | 44.9 | 40.4 | 29.5 | 28.3 | 835 | 555[2] |
| RetinaNet [Reference 19] | Resnet50 | 608 × 608 | 43.8 | 41.2 | 34.7 | 38.9 | 576 | 103[3] |

TABLE II-continued

| Method | Backbone | Input Size | mAP$_5$ | mAP$_{25}$ | mAP$_{50}$ | IoU$_{25}$ | Predict Boxes | Time (ms) |
|---|---|---|---|---|---|---|---|---|
| YOLOv3 [Reference 20] | darknet53 | 512 × 512 | 47.4 | 44.3 | 35.1 | 24.2 | 1252 | 95[4] |
| YOLOv3 | darknet53 | 608 × 608 | 48.1 | 45.2 | 33.2 | 21.4 | 1300 | 116[4] |
| YOLOv3-spp | darknet53 | 512 × 512 | 49.0 | 45.7 | 34.7 | 24.4 | 1120 | 88 |

Figure 7:
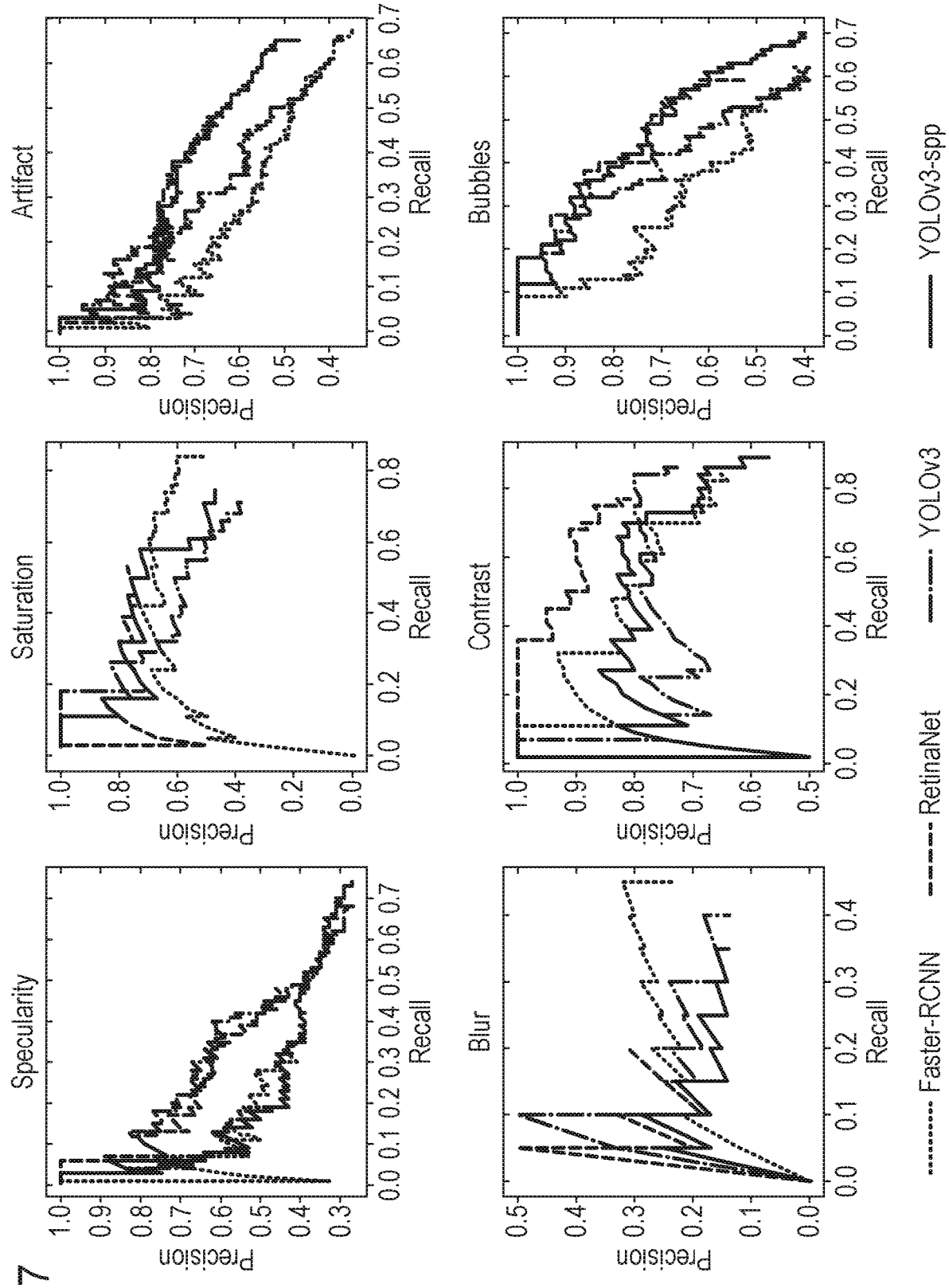
FIG. 7 is a set of class specific precision-recall curves for artefact detection.

FIG. 7 shows class specific precision-recall curves for artefact detection and Table III shows class-specific average precision (AP) of the different object detection networks. FIG. 7 and Table II show that, in terms of class-specific performance, YOLOv3-spp is the best across detecting miscellaneous artefacts and bubbles (both are predominantly present in endoscopic videos) with average precision of 48.0 and 55.9, respectively. Faster R-CNN yielded the highest average precision for saturation (71.0) and blur (14.5) while RetinaNet and YOLOv3 outperformed respectively for contrast (73.6) and specularity detection (40.0). It is worth noting that proposed YOLOv3-spp yielded second best average precision scores for speculariy (34.7), saturation (55.7) and contrast (72.1).

TABLE III

| Method | Spec. | Sat. | Arte. | Blur. | Cont. | Bubb. |
|---|---|---|---|---|---|---|
| Faster R-CNN [Reference 15] | 20.7 | 71.0 | 35.1 | 14.5 | 58.7 | 42.4 |
| RetinaNet [Reference 19] | 33.1 | 42.9 | 39.8 | 7.2 | 73.6 | 50.6 |
| YOLOv3 [Reference 20] | 40.0 | 50.4 | 44.3 | 11.6 | 70.8 | 48.9 |
| YOLOv3-spp | 34.7 | 55.7 | 48.0 | 7.5 | 72.1 | 55.9 |

Thus, to summarise, the CNN block 13 yields the highest mean average precision (mAP at 5% threshold) of 49.0 and the lowest computational time of 88 ms allowing for accurate real-time processing.

Restoration was performed as follows.

For the motion blur correction block 24, the model was trained for 300 epochs on a paired blur-sharp data set consisting of 10,710 (715 unique sharp images) multi-patient and multi-modal images with 15 different simulated motion trajectories for blur (see [Reference 27]).

The conditional generative adversarial network with added contextual and high-frequency feature losses was compared with deblurGAN [Reference 27], scale-recurrent network-based SRN-DeblurNet [Reference 46], and traditional TV-based method [Reference 31].

Figure 8:
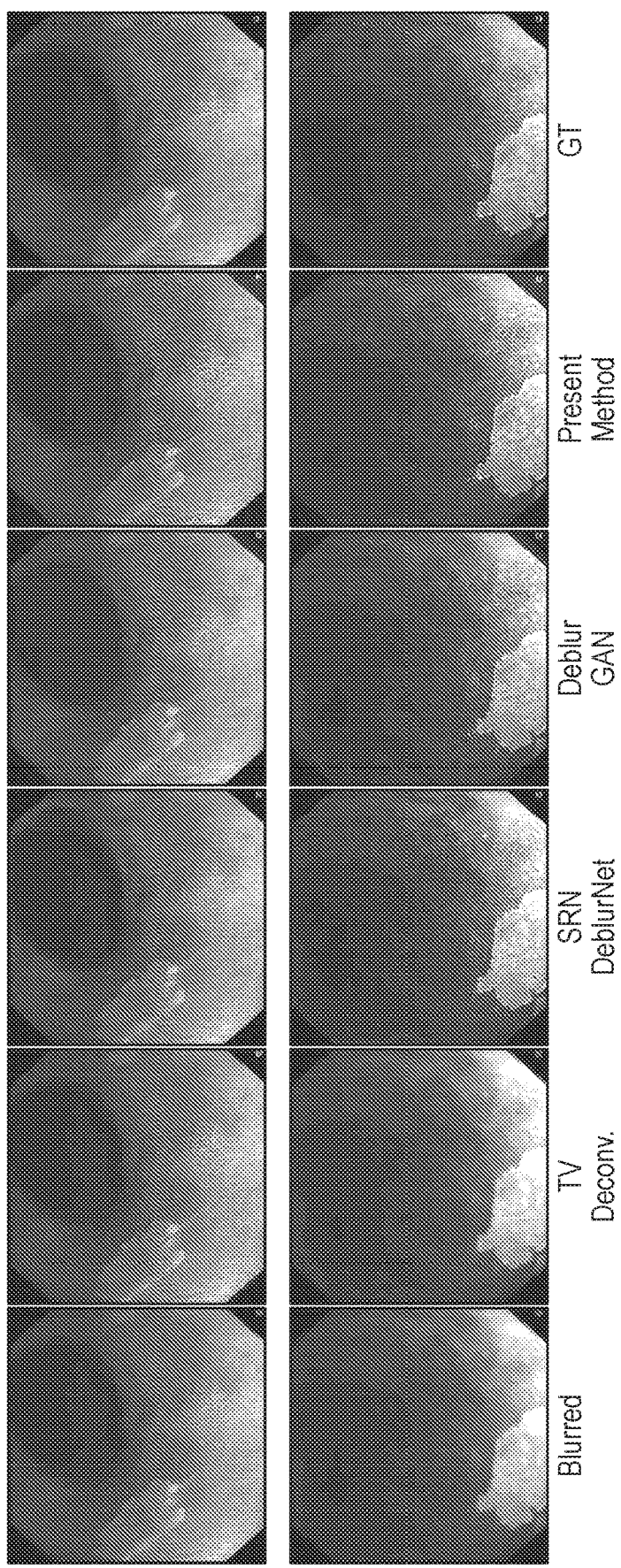
FIG. 8 is a set of pairs of frames before and after motion blur correction performed using different de-blurring methods.

TV regularizion weight λ and the blur kernel r affects the quality of recovered deblurred images [Reference 31]. λ=103 and r=2.3 were chosen after a few iterative parameter setting experiments for the data set. Retraining was performed for SRN-DeblurNet [Reference 46] and deblurGAN [Reference 27] on the same data set used by the deblurring model. The frame deblurring methods was quantitatively evaluated using 5 images with visually large blur and the simulated test trajectories (shown in Table IV) and on 3 different test sequences (simulated motion blur trajectories, shown in Table V) each with 30 images. Table IV shows the peak signal-to-noise ratio (PSNR) and the structural similarity measure (SSIM) for randomly selected images with different motion blur. Table V shows Average PSNR and average SSIM for image sequences in test trajectories both with added high-frequency (HF) feature loss (proposed) and only contextual loss (as disclosed in [Reference 27]) in conditional GAN model. FIG. 8 illustrates qualitative results for different de-blurring methods on WL and NBI frames.

Table IV shows that CGAN with $l_2$-contextual loss and added high-frequency (HF) feature loss score the highest PSNR and SSIM values for all blurred frames while TV-based deconvolution method [Reference 31] resulted in the least PSNR and SSIM values over all frames. Nearly, 1 dB increase can be seen against the deblurGAN method [Reference 27] for frames #80, #99, and #103 while 2 dB gain can be seen for #102, #116 against SRN-DeblurNet [Reference 46] using the proposed model. Overall the proposed model yields the best result compared to second best deblurGAN for the blurred image sequences in Table V. This is also seen qualitatively in FIG. 8. It can be observed that SRN-DeblurNet deforms the image at upper right in both WL and NBI frames.

TABLE IV

| | | Images with varying motion blur | | | | |
|---|---|---|---|---|---|---|
| Method | Metric | #80 | #99 | #102 | #113 | #116 |
| CGAN + cont. & | PSNR | 25.22 | 28.14 | 27.28 | 23.41 | 24.81 |
| HF feature loss | SSIM | 0.998 | 0.997 | 0.993 | 0.980 | 0.992 |
| deblur | PSNR | 25.17 | 27.93 | 26.96 | 23.4 | 24.81 |
| GAN [Reference 27] | SSIM | 0.998 | 0.997 | 0.992 | 0.979 | 0.992 |
| SRN | PSNR | 24.61 | 27.50 | 25.02 | 22.23 | 22.00 |
| DeblurNet [Reference 46] | SSIM | 0.995 | 0.996 | 0.990 | 0.970 | 0.970 |
| TV-deconv [Reference 31] | PSNR | 24.25 | 26.72 | 24.75 | 21.69 | 22.20 |
| | SSIM | 0.966 | 0.994 | 0.988 | 0.966 | 0.983 |

TABLE V

| | | Image sequences | | |
|---|---|---|---|---|
| Method | Metric | #1 | #2 | #3 |
| CGAN + cont. & | PSNR | 25.80 | 24.65 | 21.25 |
| HF feature-loss | SSIM | 0.997 | 0.980 | 0.970 |
| deblur | PSNR | 25.68 | 24.37 | 21.08 |
| CGAN[Reference 27] | SSIM | 0.996 | 0.977 | 0.968 |

For the exposure correction block 25, due to lack of any ground truth data for two different illumination conditions, the model was trained with a fused data set that included: 200 natural scene images containing diffuse (scattered light) and ambient (additional illumination to natural light giving regions with pixel saturation) illuminations 1; and 200 endoscopic image pairs simulated using cycleGAN-based style transfer [Reference 24] (separately trained on another 200 images with saturated and normal BF images with from 7 unique patients).

The results of treating for saturation removal as a global problem, correcting the entire frame for over exposure as discussed above. Table VI shows the average PSNR and average SSIM for 19 randomly selected saturated images in the simulated data set using CycleGAN. Quality assessment (QA) for simulated images, $l_2$-contexual CGAN, and post-processing using color retransfer (CRT) method are provided. These show that the restoration model demonstrates increased average values across all tested metrics, (PSNR, SSIM, VIF and RECO).

TABLE VI

| | QA for different stages | | |
|---|---|---|---|
| Metric | CyleGAN | $l_2$-contexual CGAN | post-process CRT |
| PSNR | 27.892 | 28.622 | 28.335 |
| SSIM | 0.905 | 0.964 | 0.944 |
| V IF | 0.808 | 0.810 | 0.818 |
| RECO | 1.091 | 1.313 | 1.512 |

Improvements after color transform for visual quality metrics like RECO (from 1.313 to 1.512), and VIF (from 0.810 to 0.818) illustrates boosted visual quality.

This is also evident in qualitative result presented in FIG. 9 which illustrate saturation and specularity correction. In particular, FIG. 9 shows frames and associated RGB histograms top the right of each frame. In the histograms of FIG. 9, the vertical axis is frequency [0.00-0.10] and the horizontal axis is intensity [0-255].

The first row of frames are three different original corrupted frames with outlines of saturated regions in the first two frames and outlines specularities in the third frame. The second row of frames are the restored images restored by the exposure correction block 25 using trained end-to-end generator are presented on the second row. This shows that largely saturated image patches in the left and central frames are clearly removed by the trained generator whilst preserving the underlying image details.

The third row of frames are the result of simple rescaling of the corrected image intensity. This shows that simple contrast stretching as shown in FIG. 9 (third row) by rescaling the CGAN restored frames fails to recover the original color tones.

The fourth row of frames are the result of using color-correction instead. This shows that the color transform successfully restores the original color consistency in CGAN restored images without introducing new saturation For the noise artefact correction block 26, a bottleneck approach was used to retrain the model initialised with the pretrained weights of the places2 data set [Reference 43]. To capture the large visual variations present in endoscopy images, 1000 images from 7 different patient endoscopy videos with a quality score >95% were used as the 'clean' images. 172 images were used as a validation set during the training. Both training and validation sets included multi-modal endoscopic video frames. During training and validation masks of different patch sizes {(5×5), (7×7), (11×11), (13×13), . . . , (33×33)} were randomly generated and were used for restoration. A single image can have one or multiple generated masks for restoration.

Specularity and other local artefacts are removed based on inpainting as discussed above. To validate the inpainting methods, a set of 25 images (clean) was used with randomly selected patches covering 5% and 12% of the total pixels of 512×512 image size. The present CGAN-based model with $l_1$-contextual loss model was compared with widely used traditional TV-based and patch-based inpainting methods. Table VII shows the average values for PSNR, VIF [Reference 44], and RECO [Reference 45]) metrics for restoration of missing pixels for masks covering 5% and 12% of total image pixels (512 512 pixels) with 21 randomly sampled rectangular boxes on 20 randomly selected images from 3 different patient videos. The results in Table VII show that $l_1$-contextual CGAN method has the best quality assurance values for both VIF and RECO measures (VIF: 0.95, RECO: 0.992 for 5% masked pixels and VIF: 0.883, RECO: 0.983 for 12% masked pixels).

TABLE VII

| | 5% of total pixels | | | 12% of total pixels | | | t |
|---|---|---|---|---|---|---|---|
| Method | PSNR | VIF | RECO | PSNR | VIF | RECO | s |
| TV-Based [Reference 3 | 45.130 | 0.947 | 0.984 | 40.970 | 0.881 | 0.975 | 392.0 |
| Patch-Based [Reference 4 | 43.440 | 0.940 | 0.990 | 39.520 | 0.871 | 0.984 | 35.0 |
| $l_1$-cont. CGAN | 43.487 | 0.950 | 0.922 | 39.693 | 0.883 | 0.983 | 2.5 |

Even though the TV-based inpainting method scored higher PSNR values in both cases, it scored the least RECO values (0.984 and 0.975 respectively for 5% and 12% cases) and has the highest computational cost (392 seconds). In contrast, $l_1$-contextual CGAN has the least computational time (2 s to load the trained model and apply on images on GeForce GTX 1080 Ti).

Figure 10:
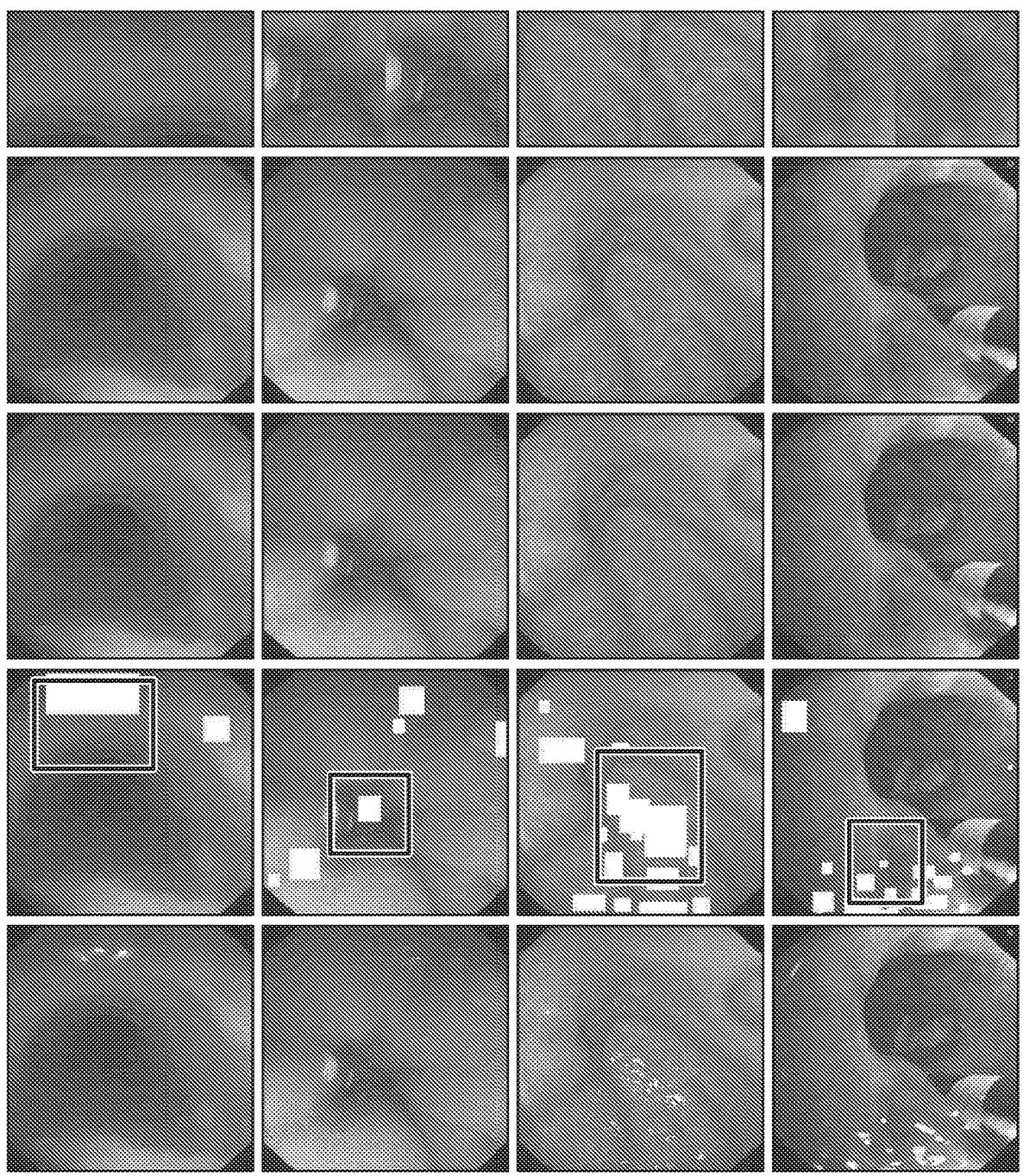
FIG. 10 is a set of frames illustrating the effect of an inpainting process.

Qualitative results for the present specularity and local artefact removal on real problematic gastro-oesophageal endoscopic frames are shown in FIG. 10 as follows.

The first column is the original courrupted frames including corrupted regions (specularity, imaging artefacts) detected by the analysis apparatus 10. As can be seen, both imaging artefacts (first and fourth rows) and specularities (second and third rows) introduce large deviations in pixel intensities both locally with respect to neighouring pixels and globally with respect to the uncorrupted image appearance.

The second column of frames show the detected bounding boxes and the restored area marked with a rectangle.

The third column of frames are the same frames subject to an inpainting process using a recent TV-based method.

The fourth column of frames the same frames subject to an inpainting process using $l_1$-contexual CGAN. As can be seen from the third and fourth columns of frames, using inpainting methods, the images have been restored based on the bounding box detections. The second best TV-based method in the third column produces blurry and non-smooth patches during the reconstruction of unknown pixels compared to CGAN generative model shown in the fourth column.

The fifth column of frames show the restored area using the TV-based process and the $l_1$-contexual CGAN. A closer look at these regions shows that local image structures are well preserved and smoother transition from reconstructed pixels to the surrounding pixels is present. An immediate noticeable ghost effect can be observed in the frame of second row using the TV-based method.

The artefact detection and recovery framework was evaluated on 10 gastroesophageal videos comprising with nearly 10,000 frames each. For artefact detection, an objectness threshold of 0.25 was used to reduce duplication in detected boxes and QS value for restoring the frame was set to 0.5. As a baseline, there was trained a sequential 6-layer convolution neural network (layer with 64 filters of sizes 3, 5 5, ReLU activation function and batch normalization) with a fully connected last layer for binary classification on a set of 6000 manually labelled positive and negative images to decide whether to discard or keep a given input video frame. A threshold of 0.75 was set for the binary classifier to keep only frames of sufficient quality.

Thus, the restoration of the classified regions of each type of image artefact show quantitative and qualitative improvements for frame restoration tasks, notably achieving improvements in both PSNR and SSIM metrics for blur and saturation, and achieving significant improvements on visual similarity metrics for specularity and other miscellaneous artefacts removal.

Figure 11:
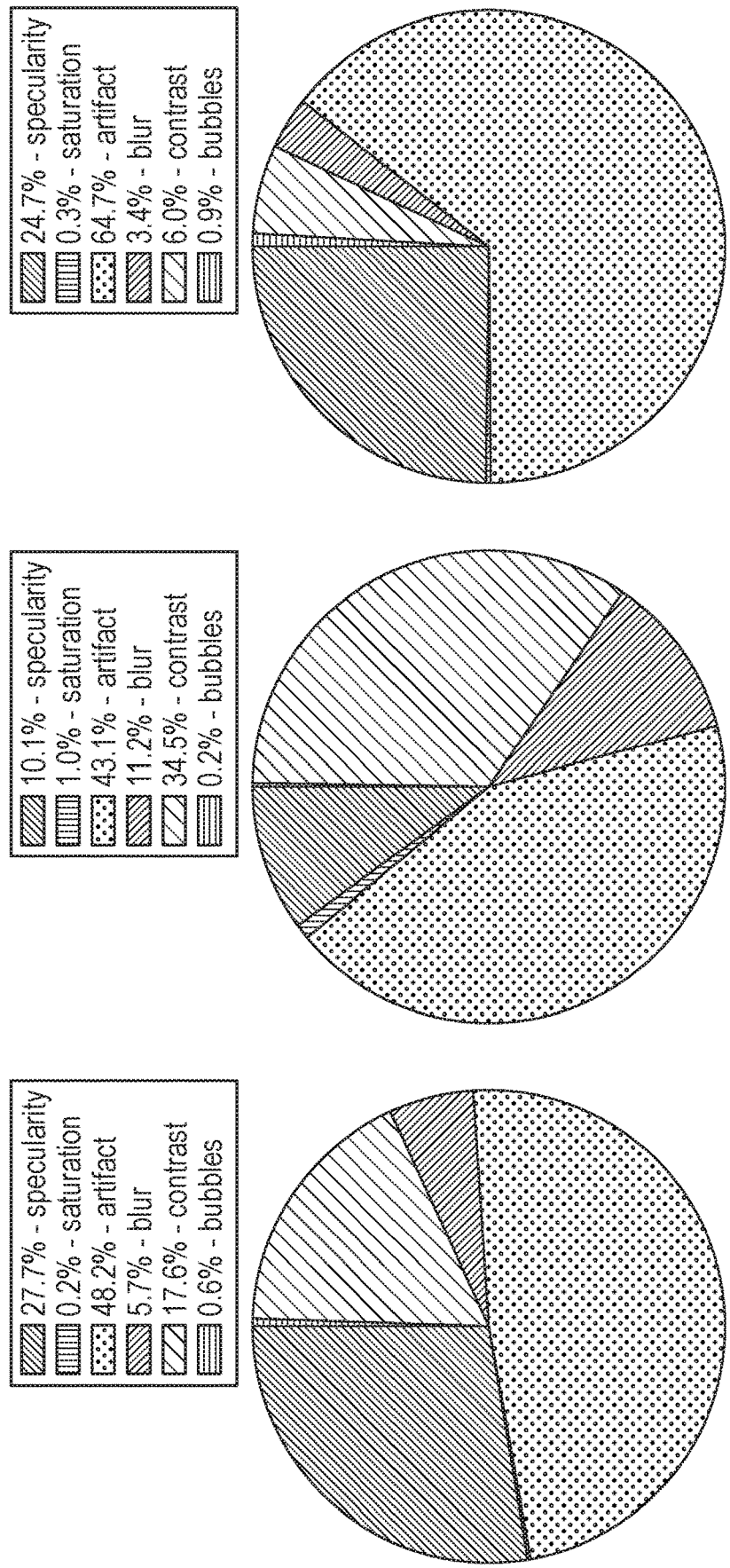
FIG. 11 is a temporal map of three video image signals showing frames selected for restoration, graphs of the percentage selected, and pie charts of the proportion of each type of artefact present.

FIG. 11 illustrates frame recovery for three clinical endoscopy video image signals. The temporal maps show the frames of the video image signals selected for restoration by a binary deep classifier and the selection block 21. The bar charts show the percentage of the frames of the video image signals selected for restoration by the two methods. The pie charts show the proportion of each artefact type present in each video image signal.

As shown in FIG. 11, the analysis apparatus 10 successfully retains the vast majority of frames compared to a binary decision.

The quality enhanced video was again fed to the CNN-based binary classifier which resulted in lower number of frame rejection than on raw videos. Consequently, the resultant video is more continuous compared to the equivalent binary cleaned video utilizing raw videos. For example, in video image signal 3, the video after frame removal based on the binary classifier directly lead to many distinct abrupt transitions that can be detrimental for post-processing algorithms as only 30% is kept. Comparatively, the analysis apparatus 10 retains 70% of frames, i.e. a frame restoration of nearly 40%. Quantitatively across all 10 endoscopic videos tested, 25% more video frames were restored, retaining on an average of 68.7% of 10 videos considered.

The clinical relevance of the restored video image signal was tested as follows.

20 high-quality frames selected from 10 test videos were corrupted with blur, specularity, saturation and miscellaneous artefacts. The restoration processes described above were then applied to these frames. Two expert endoscopists independently were asked to score these restoration results compared to the original high-quality images and corresponding videos. Scores in a range from 0 to 10 were based on 1) addition of unnatural distortions was assigned a negative score and 2) removal of distortions was assigned a positive score. The obtained mean score were: blur 7.87; specularity or miscellaneous artefacts 7.7; and saturation: 1.5. A remarkable restoration was obtained for blur and specularity or miscellaneous artefacts. However, saturation correction was not pleasant to experts mostly due to loss of 3D information (according to feedback comments) even though visual coherence was improved.

REFERENCES

[Reference 1] S. Chikkerur, V. Sundaram, M. Reisslein, and L. J. Karam, "Objective video quality assessment methods: A classification, review, and performance comparison," IEEE Trans. Broadcast., vol. 57, no. 2, pp. 165-182, 2011.

[Reference 2] D. P. Menor, C. A. Mello, and C. Zanchettin, "Objective video quality assessment based on neural networks," Procedia Comput. Sci., vol. 96, pp. 1551-1559, 2016.

[Reference 3] S. Ali, C. Daul, E. Galbrun, F. Guillemin, and W. Blondel, "Anisotropic motion estimation on edge preserving Riesz wavelets for robust video mosaicing," Patt. Recog., vol. 51, pp. 425-442, 2016.

[Reference 4] H. Liu, W. S. Lu, and M. Q. H. Meng, "De-blurring wireless capsule endoscopy images by total variation minimization," in PACRIM. IEEE, August 2011, pp. 102-106.

[Reference 5] T. Stehle, "Removal of specular reflections in endoscopic images," Acta Polytechnica, vol. 46, no. 4, 2006.

[Reference 6] S. Tchoulack, J. P. Langlois, and F. Cheriet, "A video stream processor for real-time detection and correction of specular reflections in endoscopic images," in Workshop on Circuit and Syst. and TAISA Conf. IEEE, 2008, pp. 49-52.

[Reference 7] M. Akbari, M. Mohrekesh, S. Soroushmehr, N. Karimi, S. Samavi, and K. Najarian, "Adaptive specular reflection detection and inpainting in colonoscopy video frames," arXiv preprint arXiv:1802.08402, 2018.

[Reference 8] A. Mohammed, I. Farup, M. Pedersen, Ø. Hovde, and S. Yildirim Yayilgan, "Stochastic capsule endoscopy image enhancement," J. of Imag., vol. 4, no. 6, 2018.

[Reference 9] F. Isabel, B. Sebastian, R. Carina, W. J. We, and S. Stefanie, I. Funke, S. Bodenstedt, C., J. Weitz, S. Speidel "Generative adversarial networks for specular highlight removal in endoscopic images," in Proc. SPIE, vol. 10576, 2018, pp. 10 576-10 576-9.

[Reference 10] I. J. Goodfellow, J. Pouget-Abadie, M. Mirza, B. Xu, D. Warde-Farley, S. Ozair, A. C. Courville, and Y. Bengio, "Generative adversarial nets," in NIPS, 2014, pp. 2672-2680.

[Reference 11] P. Viola and M. Jones, "Rapid object detection using a boosted cascade of simple features," in CVPR. IEEE, 2001, pp. 511-518.

[Reference 12] P. Sermanet, D. Eigen, X. Zhang, M. Mathieu, R. Fergus, and Y. Le-Cun, "Overfeat: Integrated recognition, localization and detection using convolutional networks," arXiv preprint arXiv:1312.6229, 2013.

[Reference 13] R. Girshick, J. Donahue, T. Darrell, and J. Malik, "Rich feature hierarchies for accurate object detection and semantic segmentation," in CVPR. IEEE, 2014, pp. 580-587.

[Reference 14] J. R. Uijlings, K. E. Van De Sande, T. Gevers, and A. W. Smeulders, "Selective search for object recognition," Int. J. of Comput. vision, vol. 104, no. 2, pp. 154-171, 2013.

[Reference 15] S. Ren, K. He, R. Girshick, and J. Sun, "Faster r-cnn: Towards real-time object detection with region proposal networks," in NIPS, 2015, pp. 91-99.

[Reference 16] J. Redmon, S. Divvala, R. Girshick, and A. Farhadi, "You only look once: Unified, real-time object detection," in CVPR. IEEE, 2016, pp. 779-788.

[Reference 17] K. He, X. Zhang, S. Ren, and J. Sun, "Spatial pyramid pooling in deep convolutional networks for visual recognition," in ECCV. Springer, 2014, pp. 346-361.

[Reference 18] T.-Y. Lin, P. Dollar, R. B. Girshick, K. He, B. Hariharan, and S. J. Belongie, "Feature pyramid networks for object detection," in CVPR. IEEE, 2017, pp. 936-944.

[Reference 19] T.-Y. Lin, P. Goyal, R. Girshick, K. He, and P. Dolla'r, "Focal loss for dense object detection," arXiv preprint arXiv:1708.02002, 2017.

[Reference 20] J. Redmon and A. Farhadi, "Yolov3: An incremental improvement," arXiv preprint arXiv: 1804.02767, 2018.

[Reference 21] T.-Y. Lin, M. Maire, S. Belongie, J. Hays, P. Perona, D. Ramanan, P. Dollar, and C. L. Zitnick, "Microsoft coco: Common objects in context," in ECCV. Springer, 2014, pp. 740-755.

[Reference 22] C. A. Z. Barcelos and M. A. Batista, "Image restoration using digital inpainting and noise removal," Image and Vision Comput., vol. 25, no. 1, pp. 61-69, 2007.

[Reference 23] M. Mirza and S. Osindero, "Conditional generative adversarial nets," CoRR, vol. abs/1411.1784, 2014.

[Reference 24] J.-Y. Zhu, T. Park, P. Isola, and A. A. Efros, "Unpaired image-to-image translation using cycle-consistent adversarial networks," in ICCV. IEEE, 2017, pp. 2242-2251.

[Reference 25] P. Isola, J.-Y. Zhu, T. Zhou, and A. A. Efros, "Image-to-image translation with conditional adversarial networks," CVPR, 2017.

[Reference 26] T. Karras, T. Aila, S. Laine, and J. Lehtinen, "Progressive growing of gans for improved quality, stability, and variation," CoRR, 2017.

[Reference 27] O. Kupyn, V. Budzan, M. Mykhailych, D. Mishkin, and J. Matas, "Deblurgan: Blind motion deblurring using conditional adversarial networks," CoRR, vol. abs/1711.07064, 2017.

[Reference 28] B. Duhyeon and S. Hyunjung, "Improved training of generative adversarial networks using representative features," CoRR, vol. abs/1801.09195, 2018.

[Reference 29] H. Tong, M. Li, H. Zhang, and C. Zhang, "Blur detection for digital images using wavelet transform," in ICME. IEEE, 2004, pp. 17-20.

[Reference 30] L. Xu, S. Zheng, and J. Jia, "Unnatural 10 sparse representation for natural image deblurring," in CVPR. IEEE, 2013, pp. 1107-1114.

[Reference 31] P. Getreuer, "Total Variation Deconvolution using Split Bregman," Image Process. On Line, vol. 2, pp. 158-174, 2012.

[Reference 32] A. Chakrabarti, "A neural approach to blind motion deblurring," in ECCV. Springer, 2016, pp. 221-235.

[Reference 33] S. Nah, T. H. Kim, and K. M. Lee, "Deep multi-scale convolutional neural network for dynamic scene deblurring," in CVPR. IEEE, 2017, pp. 257-265.

[Reference 34] A. Buades, T. Le, J.-M. Morel, and L. Vese, "Cartoon+Texture Image Decomposition," Image Process. On Line, vol. 1, 2011.

[Reference 35] M. Arjovsky, S. Chintala, and L. Bottou, "Wasserstein generative adversarial networks," in ICML, 2017, pp. 214-223.

[Reference 36] A. P. Hertzmann, "Algorithms for rendering in artistic styles," Ph.D. dissertation, New York University, Graduate School of Arts and Science, 2001.

[Reference 37] J. Shen and T. F. Chan, "Mathematical models for local nontexture inpaintings," SIAM J. of Appl. Math., vol. 62, no. 3, pp. 1019-1043, 2002.

[Reference 38] A. A. Efros and W. T. Freeman, "Image quilting for texture synthesis and transfer," in SIGGRAPH. ACM, 2001, pp. 341-346.

[Reference 39] R. Kohler, C. Schuler, B. Scholkopf, and S. Harmeling, "Mask-specific inpainting with deep neural networks," in GCPR. Springer, 2014, pp. 523-534, 1NCS.

[Reference 40] D. Pathak, P. Krahenbuhl, J. Donahue, T. Darrell, and A. A. Efros, "Context encoders: Feature learning by inpainting," in CVPR. IEEE, 2016, pp. 2536-2544.

[Reference 41] S. Iizuka, E. Simo-Serra, and H. Ishikawa, "Globally and Locally Consistent Image Completion," SIGGRAPH, vol. 36, no. 4, pp. 107:1-107:14, 2017.

[Reference 42] J. Yu, Z. Lin, J. Yang, X. Shen, X. Lu, and T. S. Huang, "Generative image inpainting with contextual attention," CoRR, vol. abs/1801.07892, 2018. [Reference Online]. Available: http://arxiv.org/abs/1801.07892

[Reference 43] B. Zhou, A. Lapedriza, A. Khosla, A. Oliva, and A. Torralba, "Places: A 10 million image database for scene recognition," IEEE Trans. Pattern Anal. Mach. Intell., vol. 40, no. 6, pp. 1452-1464, 2018.

[Reference 44] H. R. Sheikh and A. C. Bovik, "Image information and visual quality," IEEE Trans. Image Process., vol. 15, no. 2, pp. 430-444, 2006.

[Reference 45] V. Baroncini, L. Capodiferro, E. D. D. Claudio, and G. Jacovitti, "The polar edge coherence: A quasi blind metric for video quality assessment," in EUSIPCO, August 2009, pp. 564-568.

[Reference 46] X. Tao, H. Gao, X. Shen, J. Wang, and J. Jia, "Scale-recurrent network for deep image deblurring," in CVPR. IEEE, 2018, pp. 8174-8182.

[Reference 47] A. Newson, A. Almansa, Y. Gousseau, and P. Prez, "Non-Local Patch-Based Image Inpainting," Image Process. On Line, vol. 7, pp. 373-385, 2017.

[Reference 48] G. R. Cameron et al. "Detection and staging of esophageal cancers within Barrett's esophagus is improved by assessment in specialized Barrett's units". In: Gastrointestinal endoscopy 80.6 (2014), pp. 971-983.

[Reference 49] D. W. Schölvinck et al. "Detection of lesions in dysplastic Barrettâ˜Y's esophagus by community and expert endoscopists". In: Endoscopy 49.02 (2017), pp. 113-120.

The invention claimed is:

1. A method of analysing a video image signal comprising successive frames imaging an endoscopy procedure, the method comprising:

analysing the video image signal using a machine learning technique that classifies regions of the frames as belonging to one of plural classes corresponding to different types of image artefact, the classes including a motion blur class corresponding to motion blur of the image, at least one erroneous exposure class corresponding to a type of erroneous exposure of the image, and at least one noise artefact class corresponding to a type of image artefact that introduces noise to the frame; and deriving at least one quality score representing image quality of the successive frames based on the classified regions.

2. The method of claim 1, wherein the at least one erroneous exposure class includes two erroneous exposure classes corresponding respectively to over-exposure of the image and under-exposure of the image.

3. The method of claim 1, wherein the at least one noise artefact class include one or more of:
a noise artefact class corresponding to occlusion of the image by a bubble;
a noise artefact class corresponding to specular reflection;
a noise artefact class corresponding to a noise artefact other than a bubble or specular reflection.

4. The method of claim 3, wherein the noise artefact other than a bubble or specular reflection comprises any one or more of a chromatic aberration or occlusion by debris.

5. The method of claim 1, wherein the at least one quality score is based on the areas of the classified regions, the quality scores representing quality that decreases with area.

6. The method of claim 1, the at least one quality score is based on the locations of the classified regions, the quality scores representing quality that is lower for locations that are central in the image than for locations that are not central.

7. The method of claim 1, wherein the at least one quality score includes a combined quality score based on the classified regions of all types.

8. The method of claim 7, wherein the combined quality score is based on the areas of the classified regions of each class weighted by weights that are dependent on the class, the quality scores representing quality that decreases with area.

9. The method of claim 7, wherein the combined quality score is based on the locations of the classified regions of each class weighted by weights that are dependent on the class, the quality scores representing quality that that is lower for locations that are central in the image than for locations that are not central.

10. The method of claim 8, wherein the weights are further dependent on the number of classified regions.

11. The method of claim 1, further comprising restoring at least some image frames by processing the image frames to reduce the types of image artefact corresponding to the classes of image artefact to which the classified regions belong.

12. The method of claim 11, wherein the step of restoring comprises processing the image frames by separate processes for each class to reduce the corresponding type of image artefact.

13. The method of claim 12, wherein the separate processes are performed in a predetermined order of the classes to which the regions belong, wherein the predetermined order may optionally comprise the motion blur class followed by the at least one erroneous exposure class followed by the at least one noise artefact class.

14. The method of claim 12, wherein the process for the motion blur class comprises a blind frame deblurring process which may deconvolve the frame with an optimised kernel representing the motion blur.

15. The method of claim 14, wherein the blind frame deblurring process uses a Generative Adversarial Network that optionally is conditioned on prior information and/or embeds a contextual loss, which may comprise an $l_2$-contextual loss and a high-frequency contextual loss.

16. The method of claim 12, wherein the process for the at least one erroneous exposure class comprises a gamma correction process that is optionally non-linear and/or comprises correction with an optimised gamma function.

17. The method of claim 16, wherein the gamma correction process uses a Generative Adversarial Network that optionally is conditioned on prior information and/or embeds a contextual loss, which may be an $l_2$-contextual loss.

18. The method of claim 16, wherein the process for the at least one erroneous exposure class further comprises a colour transfer.

19. The method of claim 12, wherein the process for the at least one noise artefact class comprises an inpainting process.

20. The method of claim 19, wherein the inpainting process uses a Generative Adversarial Network that optionally is conditioned on prior information and/or embeds a contextual loss, which may be an $l_1$-contextual loss.

21. The method of claim 11, further comprising selecting the image frames that are restored on the basis of the quality scores.

22. The method of claim 1, wherein the machine learning technique is a convolutional neural network.

23. The method of claim 22, wherein the convolutional neural network is arranged to simultaneously predict the regions and the classes of the regions in a single stage, which single stage may use spatial pyramid pooling.

24. A non-transitory computer-readable storage medium storing a computer program capable of execution by a computer apparatus and comprising instructions configured, on execution, to cause the computer apparatus to perform the method of claim 1.

25. An analysis apparatus for analysing a video image signal comprising successive frames of an endoscopy procedure, the analysis apparatus comprising:
a machine learning block arranged to analysing the video image signal using a machine learning technique that classifies regions of the frames as belonging to one of plural classes corresponding to respective types of image artefact, the classes including
a motion blur class corresponding to motion blur of the image,
at least one erroneous exposure class corresponding to a type of erroneous exposure of the image, and
at least one noise artefact class corresponding to a type of image artefact that is noise; and
a quality score block arranged to derive quality scores representing image quality of the successive frames based on the classified regions.

* * * * *